US012574862B2

(12) United States Patent
Lee

(10) Patent No.: US 12,574,862 B2
(45) Date of Patent: Mar. 10, 2026

(54) COMMUNICATION DEVICE AND IMAGE DISPLAY APPARATUS INCLUDING THE SAME

(71) Applicant: LG ELECTRONICS INC., Seoul (KR)

(72) Inventor: Sinjae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 463 days.

(21) Appl. No.: 18/204,000

(22) Filed: May 31, 2023

(65) Prior Publication Data

US 2023/0397124 A1    Dec. 7, 2023

(30) Foreign Application Priority Data

Jun. 7, 2022    (KR) ........................ 10-2022-0068701

(51) Int. Cl.
*H04W 52/36*        (2009.01)
*H04W 52/34*        (2009.01)

(52) U.S. Cl.
CPC ......... *H04W 52/36* (2013.01); *H04W 52/343* (2013.01)

(58) Field of Classification Search
CPC ... H04W 52/36; H04W 52/343; H04W 52/42; H04W 52/38; H04M 1/72412;
(Continued)

(56) References Cited

U.S. PATENT DOCUMENTS 8,750,795 B2 *  6/2014  Krutt ....................... H04W 4/50
                                                        455/41.1

RE47,720 E  *  11/2019  Burchfiel ............ H04W 52/343
2014/0274105 A1*  9/2014  Wang .................. H04W 52/244
                                                        455/454

FOREIGN PATENT DOCUMENTS

KR    1020190042373    4/2019
KR      102095319    4/2020
KR      102292979    8/2021

OTHER PUBLICATIONS

Ksentini, Adlen, Mohamed Naimi, and Abdelhak Gueroui. "Toward an improvement of H. 264 video transmission over IEEE 802.11e through a cross-layer architecture." IEEE communications magazine 44.1 (2006): 107-114. (Year: 2006).*

(Continued)

*Primary Examiner* — Sharad Rampuria
(74) *Attorney, Agent, or Firm* — LEE, HONG, DEGERMAN, KANG & WAIMEY

(57)    ABSTRACT

A communication device and an image display apparatus including the same are disclosed. A communication device of an embodiment of the present disclosure includes a first antenna and a second antenna to receive or transmit a wireless signal of a first and a second communication standard, respectively, and a processor to receive and process a signal or to transmit a processed signal, wherein, in case in which the second antenna receives a wireless signal while the first antenna wirelessly receives first data and wirelessly transmits information related to the first data with a first power, the processor is configured to wirelessly transmit the information related to the first data with a second power lower than the first power. Accordingly, wireless reception performance can be stably secured during wireless communication based on a plurality of communication standards.

16 Claims, 22 Drawing Sheets

100

(58) Field of Classification Search
CPC ............. H04N 21/426; H04N 21/4222; H04N
21/42221; H04N 21/4425; H04B 1/713
See application file for complete search history.

(56) References Cited

OTHER PUBLICATIONS

Korean Intellectual Property Office Application No. 10-2022-0068701, Office Action dated Jul. 4, 2024, 3 pages.

* cited by examiner

Armbx    Armax    Armcx

Level

Channel

COMMUNICATION DEVICE AND IMAGE DISPLAY APPARATUS INCLUDING THE SAME

CROSS-REFERENCE TO RELATED APPLICATION

Pursuant to 35 U.S.C. § 119(a), this application claims the benefit of earlier filing date and right of priority to Korean Patent Application No. 10-2022-0068701, filed on Jun. 7, 2022, the contents of which are hereby incorporated by reference herein in its entirety.

BACKGROUND

1. Field of the Disclosure

The present disclosure relates to a communication device and an image display apparatus including the same, and more particularly, to a communication device capable of stably securing wireless reception performance while performing wireless communication based on a plurality of communication standards, and an image display apparatus including the same.

2. Description of the Related Art

A communication device is a device that performs communication between a plurality of devices. In particular, a wireless communication device is a device that performs wireless communication between a plurality of devices.

Such a wireless communication device is employed in an image display apparatus or the like and is used for content data reception or the like.

In case in which a communication device performs wireless communication based on a plurality of wireless communication standards, wireless communication may become unstable if the frequency bands are similar.

SUMMARY

It is an object of the present disclosure to provide a communication device capable of stably securing wireless reception performance while performing wireless communication based on a plurality of communication standards, and an image display apparatus including the same.

It is another object of the present disclosure to provide a communication device capable of stably receiving a wireless signal based on a second communication standard during data transmission based on a first communication standard and wireless signal reception based on the second communication standard, and an image display apparatus including the same.

In accordance with an aspect of the present disclosure, the above and other objects can be accomplished by the provision of a communication device including: a first antenna configured to receive or transmit a wireless signal of a first communication standard; a second antenna configured to receive or transmit a wireless signal of a second communication standard; and a processor configured to receive and process a signal from the first antenna or the second antenna or to transmit a processed signal to the first antenna or the second antenna, wherein, in case in which the second antenna receives a wireless signal while the first antenna wirelessly receives first data and wirelessly transmits information related to the first data with a first power, the processor controls the first antenna to wirelessly transmit the information related to the first data with a second power lower than the first power.

In case in which the second antenna receives a wireless signal while the first antenna wirelessly receives content data which is the first data and wirelessly transmits information related to the content data with the first power, the processor may control the first antenna to wirelessly transmit the information related to the content data with the second power lower than the first power.

The processor may control the first antenna to wirelessly transmit the information related to the content data with a power higher than the second power in case in which the second antenna does not receive wireless signals for a predetermined time or longer while the first antenna wirelessly transmits the information related to the content data with the second power lower than the first power.

The processor may control the second power to decrease as an amount of information related to the content data increases or a transmission period of the information related to the content data increases.

The processor may be configured to wirelessly transmit the information related to the content data with the second power and increase a transmission interval of the information related to the content data as the amount of information related to the content data increases or the transmission period of the information related to the content data increases.

A period in which the first antenna wirelessly transmits the information related to the content data may be shorter than a period in which the second antenna receives a wireless signal.

Power of a wireless signal received by the second antenna may be lower than the first power.

The power of the wireless signal received by the second antenna may be lower than the second power.

Frequency channel hopping may occur during wireless signal reception through the second antenna.

The processor may control a wireless transmission power of the first antenna to be lower than a set power in case in which the second antenna performs wireless reception in a state in which the first antenna performs wirelessly transmission, and wireless transmission communication traffic of the first antenna is equal to or greater than a set level.

The processor may control the wireless transmission power of the first antenna to become the set power in case in which the second antenna performs wireless reception in a state in which the first antenna performs wirelessly transmission, and the wireless transmission communication traffic of the first antenna is less than the set level. In accordance with another aspect of the present disclosure, there is provided an image display apparatus including: a display; a signal processing device configured to control the display; a communication device configured to perform wireless communication based on a first communication standard or to perform wireless communication based on a second communication standard, wherein the communication device includes: a first antenna configured to receive or transmit a wireless signal of the first communication standard; a second antenna configured to receive or transmit a wireless signal of the second communication standard; and a processor configured to receive and process a signal from the first antenna or the second antenna or to transmit a processed signal to the first antenna or the second antenna, wherein, in case in which the second antenna receives a wireless signal while the first antenna wirelessly receives first data and wirelessly transmits information related to the first data with a first power, the processor controls the first antenna to wirelessly transmit the information related to the first data with a second power lower than the first power.

The communication device may wirelessly receive content data which is first data from an access point device through the first antenna, transmit information related to the content data to the access point device, and receive a remote control signal from a remote control device through the second antenna.

The communication device may wirelessly receive content data which is first data from an access point device through the first antenna, transmit information related to the content data to the access point device, and receive wireless data from a mobile terminal through the second antenna.

The signal processing device may be configured to display a content image corresponding to content data received through the communication device on the display, and information related to the content image is transmitted to a server through the communication device.

The communication device may wirelessly transmit the information related to the content image with the second power lower than the first power in case in which a wireless signal is received from a remote control device or a mobile terminal while the information related to the content image is wirelessly transmitted through the first antenna.

The signal processing device may control a notification message indicating wireless signal instability to be output in case in which a wireless signal is wirelessly transmitted with the first power in a state in which a wireless signal is received through the second antenna during wireless transmission of the information related to the content image through the first antenna, and may control the notification message to disappear in case in which a wireless signal is wirelessly transmitted with the second power lower than the first power in a state in which a wireless signal is received through the second antenna during wireless transmission of the information related to the content image through the first antenna.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE PREFERRED EMBODIMENTS

Reference will now be made in detail to the preferred embodiments of the present disclosure, examples of which are illustrated in the accompanying drawings.

The suffixes "module" and "unit" in elements used in description below are given only in consideration of ease in preparation of the specification and do not have specific meanings or functions. Therefore, the suffixes "module" and "unit" may be used interchangeably.

Figure 1:
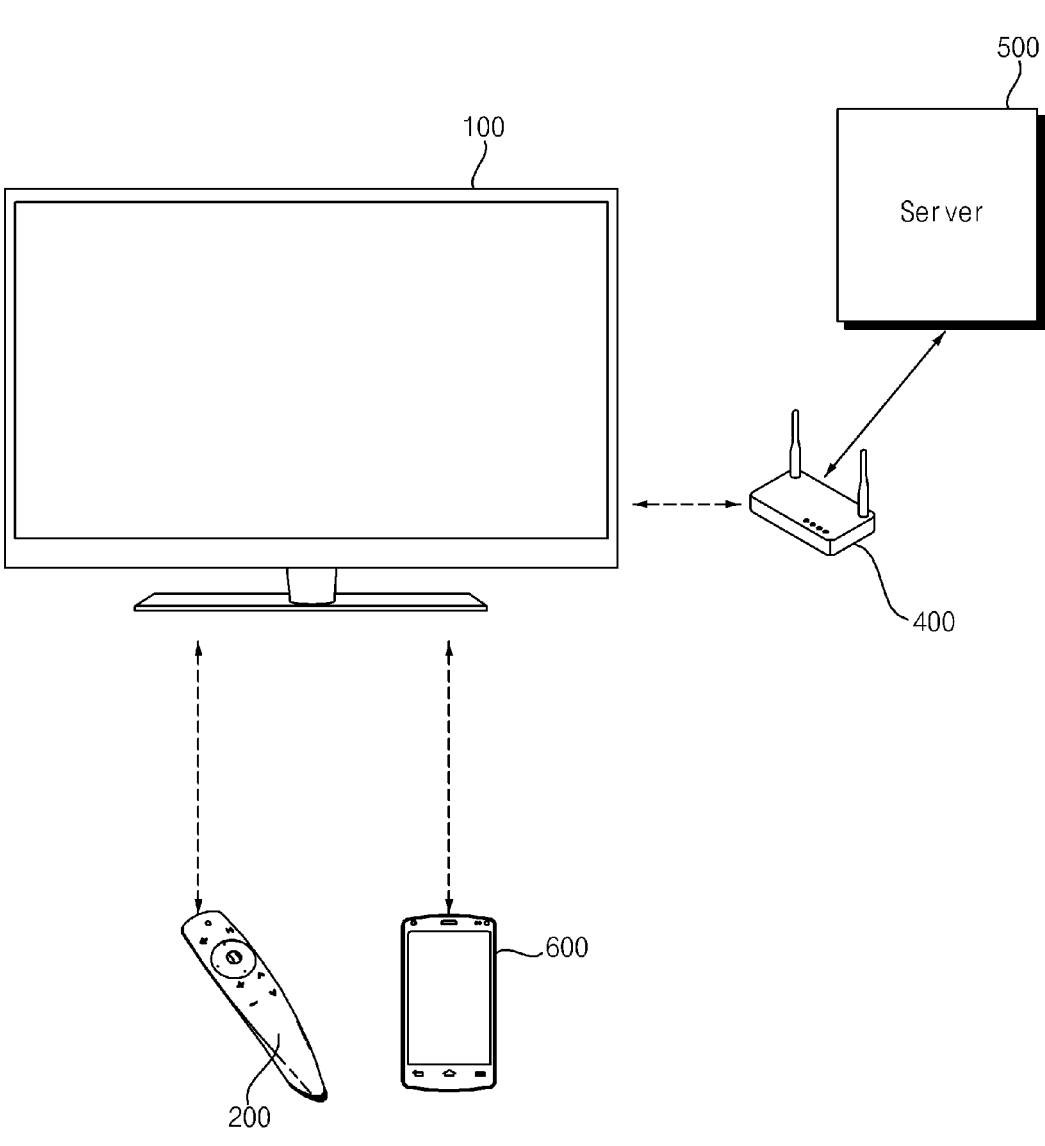
FIG. 1 is a view illustrating an outer appearance of an image display apparatus according to an embodiment of the present disclosure.

FIG. 1 illustrates an outer appearance of an image display apparatus according to an embodiment of the present disclosure.

Referring to FIG. 1, an image display apparatus 100 according to an embodiment of the present disclosure includes a display (180 in FIG. 2), a signal processing device (170 in FIG. 2) for displaying an image on the display, and a communication device (155 in FIG. 2) for performing wireless communication with a remote control device 200 or a mobile terminal 600.

The communication device (155 of FIG. 2) in the image display apparatus 100 may receive or transmit a wireless signal of a first communication standard and may receive or transmit a wireless signal of a second communication standard.

For example, the communication device (155 in FIG. 2) in the image display apparatus 100 may wirelessly receive first data of the first communication standard from an access point device 400 and wirelessly transmit information related to the first data to the access point device 400. In addition, the access point device 400 may transmit the information related to the first data to a server 500.

Further, the communication device (155 in FIG. 2) in the image display apparatus 100 may be paired with the remote control device 200 or the mobile terminal 600 based on the second communication standard and receive a wireless signal based on the second communication standard.

In case in which a frequency band of the first communication standard and a frequency band of the second communication standard are similar to or overlap, wireless signal reception based on the second communication standard tends to be unstable.

Accordingly, an embodiment of the present disclosure proposes a method for stably securing wireless reception performance during wireless communication based on a plurality of communication standards.

To this end, the communication device (155 of FIG. 2) in the image display apparatus 100 according to an embodiment of the present disclosure wirelessly receives first data based on the first communication standard, and in case in which receiving a wireless signal of the second communication standard while wirelessly transmitting information related to the first data with a first power based on the first communication standard, wirelessly transmits information related to the first data with a second power lower than the first power. Accordingly, it is possible to stably receive a wireless signal based on the second communication standard. This will be described in more detail below with reference to FIG. 6A.

Meanwhile, the image display apparatus 100 of FIG. 1 may be various apparatuses such as a TV, a monitor, a vehicle display, a tablet, a notebook computer, and a commercial display.

Figure 2:
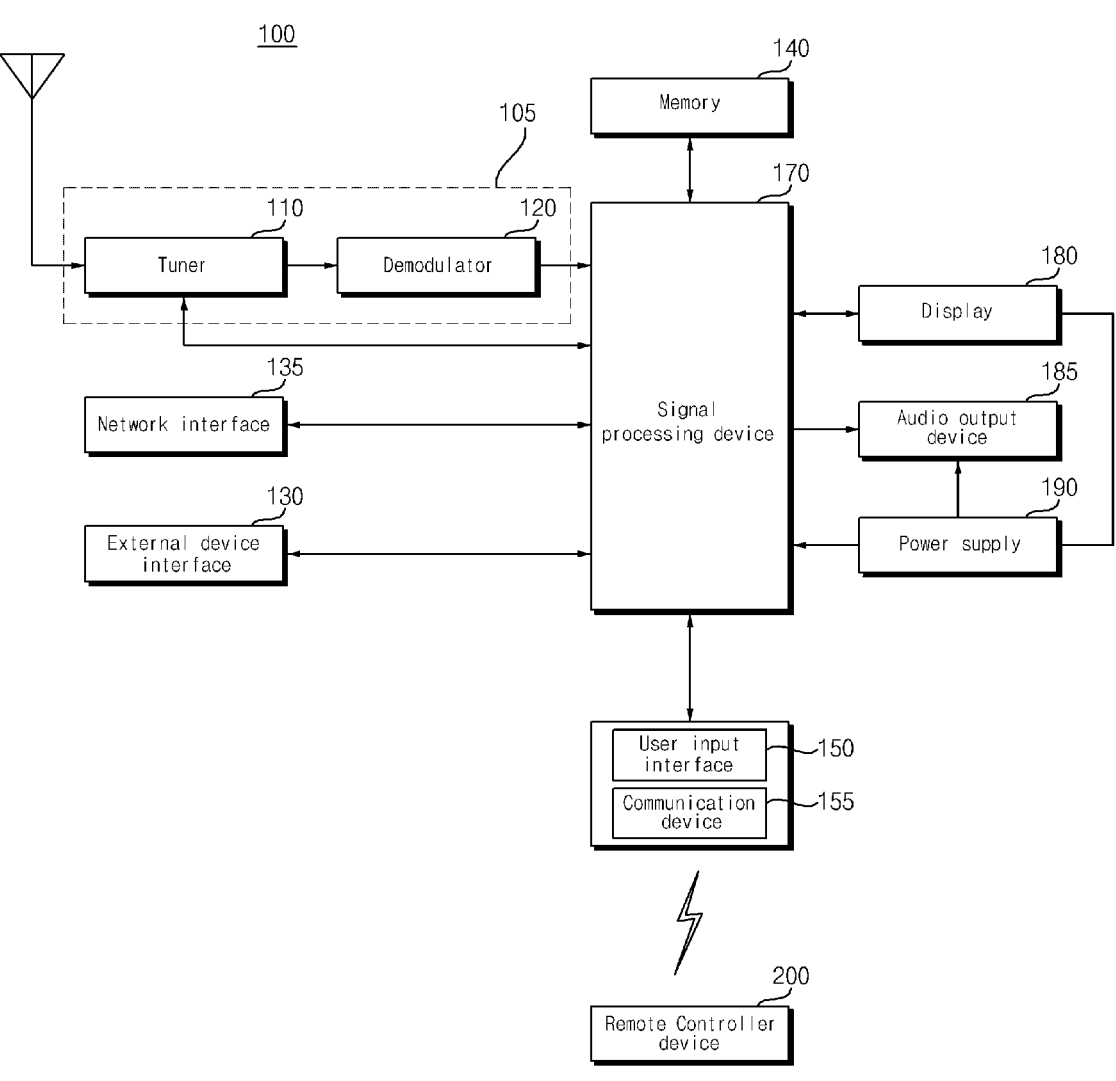
FIG. 2 is an internal block diagram of the image display apparatus of FIG. 1.

FIG. 2 is an internal block diagram of the image display apparatus of FIG. 1.

Referring to FIG. 2, the image display apparatus 100 according to an embodiment of the present disclosure may include a broadcast receiver 105, an external device interface 130, a memory 140, a user input interface 150, a sensor device (not shown), a signal processing device 170, a display 180, and an audio output device 185.

The broadcast receiver 105 may include a tuner 110, a demodulator 120, and a network interface 135. As needed, the broadcast receiver 105 may be designed not to include the network interface 135 while including the tuner 110 and the demodulator 120. In contrast, the broadcast receiver 105 may include only the network interface 135 and does not include the tuner 110 and the demodulator 120.

Unlike FIG. 2, the broadcast receiver 105 may include the external device interface 130. For example, a broadcast signal generated by a set-top box (not shown) may be received through the external device interface 130.

The tuner 110 selects a radio frequency (RF) broadcast signal corresponding to a channel selected by a user or all prestored channels from among RF broadcast signals received through an antenna. In addition, the tuner 110 converts the selected RF broadcast signal into an intermediate frequency (IF) signal, a baseband image, or an audio signal.

For example, if the selected RF broadcast signal is a digital broadcast signal, the tuner 110 converts the digital broadcast signal into a digital intermediate frequency (DIF) signal. If the selected RF broadcast signal is an analog broadcast signal, the tuner 110 converts the analog broadcast signal into an analog baseband image or an audio signal (composite video baseband signal (CVBS)/sound IF (SIF)). That is, the tuner 110 may process a digital broadcast signal or an analog broadcast signal. The analog baseband image or audio signal (CVBS/SIF) output from the tuner 110 may be directly input to the signal processing device 170.

The tuner 110 may sequentially select RF broadcast signals for all broadcast channels stored through a channel memorization function from among RF broadcast signals received through the antenna and convert the same into an IF signal, a baseband image, or an audio signal.

To receive broadcast signals of a plurality of channels, a plurality of tuners 110 may be provided. Alternatively, a single tuner to receive broadcast signals of a plurality of channels simultaneously may be provided.

The demodulator 120 receives and demodulates the DIF signal converted by the tuner 110.

After performing demodulation and channel decoding, the demodulator 120 may output a transport stream (TS) signal. Herein, the stream signal may be a signal obtained by multiplexing an image signal, an audio signal, and a data signal.

The TS signal output from the demodulator 120 may be input to the signal processing device 170. After performing demultiplexing and image/audio signal processing, the signal processing device 170 outputs an image to the display 180 and audio to the audio output device 185.

The external device interface 130 may transmit or receive data to or from an external device connected thereto. To this end, the external device interface 130 may include an audio/video (A/V) input/output device (not shown) or a wireless transceiver (not shown).

The external device interface 130 may be connected to external devices such as a digital versatile disc (DVD), a Blu-ray player, a game console, a camera, a camcorder, a (notebook) computer, and a set-top box in a wired/wireless manner and perform input/output operations with external devices.

The A/V input/output device may receive image and audio signals from an external device. The wireless transceiver may perform short-range wireless communication with other electronic devices.

The network interface 135 provides an interface for connecting the image display apparatus 100 with a wired/wireless network including the Internet. For example, the network interface 135 may receive content or data provided by an Internet or content provider or a network operator over a network.

The memory 140 may store programs for processing and control of signals in the signal processing device 170 and also store a signal-processed image, audio, or data signal.

The memory 140 may function to temporarily store an image signal, an audio signal, or a data signal input through the external device interface 130. In addition, the memory 140 may store information about a predetermined broadcast channel through the channel memorization function such as a channel map.

While an embodiment in which the memory 140 is provided separately from the signal processing device 170 is illustrated in FIG. 2, embodiments of the present disclosure are not limited thereto. The memory 140 may be included in the signal processing device 170.

The user input interface 150 may transmit a signal input by a user to the signal processing device 170 or transmit a signal from the signal processing device 170 to the user.

For example, the user input interface 150 may transmit/receive user input signals such as power on/off, channel selection, and screen window setting to/from the remote control device 200 or transmit user input signals input through local keys (not shown) such as a power key, a channel key, a volume key, or a setting key to the signal processing device 170. The user input interface 150 may transmit user input signals input through a sensor device (not shown) to sense gesture of the user to the signal processing device 170 or transmit a signal from the signal processing device 170 to the sensor device (not shown).

Meanwhile, the user input interface 150 may include the communication device 155 capable of performing wireless communication based on a plurality of standards.

Unlike the figure, the communication device 155 may be provided in the network interface 135 or the external device interface 130 or may be provided separately from the user input interface 150 and the like.

The signal processing device 170 may demultiplex the TS signal input through the tuner 110, the demodulator 120, or the external device interface 130 or process the demultiplexed signal to generate a signal for outputting an image or audio.

The image signal processed by the signal processing device 170 may be input to the display 180 such that an image corresponding to the image signal may be displayed on the display. In addition, the image signal processed by the signal processing device 170 may be input to an external output device through the external device interface 130.

The audio signal processed by the signal processing device 170 may be output to the audio output device 185 in the form of sound. In addition, the audio signal processed by the signal processing device 170 may be input to an external output device through the external device interface 130.

Although not shown in FIG. 2, the signal processing device 170 may include a demultiplexer and an image processor, which will be described with reference to FIG. 3 later.

Additionally, the signal processing device 170 may control an overall operation of the image display apparatus 100. For example, the signal processing device 170 may control the tuner 110 to tune to an RF broadcast corresponding to a channel selected by the user or a prestored channel.

The signal processing device 170 may control the image display apparatus 100 according to a user command input through the user input interface 150 or according to an internal program.

The signal processing device 170 may control the display 180 to display an image. Herein, the image displayed on the display 180 may be a still image, a moving image, a 2D image, or a 3D image.

The signal processing device 170 may control the predetermined 2D object in an image displayed on the display 180 as a 3D object. For example, the object may be at least one of an accessed web page (a newspaper, a magazine, etc.), an electronic program guide (EPG), various menus, a widget, an icon, a still image, a moving image or text.

Such a 3D object may be processed to have a sense of depth different from that of the image displayed on the display 180. Desirably, the 3D object may be processed to appear to protrude from the image displayed on the display 180.

The signal processing device 170 may recognize the location of the user based on an image captured by a capture device (not shown). For example, the signal processing device 170 may recognize the distance between the user and the image display apparatus 100 (i.e., a z-axis coordinate). Additionally, the signal processing device 170 may recognize an x-axis coordinate and y-axis coordinate in the display 180, corresponding to the location of the user.

Although not shown in FIG. 2, the image display apparatus 100 may further include a channel browsing processor for generating a thumbnail image corresponding to a channel signal or an external input signal. The channel browsing processor may receive a TS signal output from the demodulator 120 or a TS signal output from the external device interface 130, extract an image from the received TS signal, and generate a thumbnail image. The generated thumbnail image may be TS-decoded together with a decoded image and then input to the signal processing device 170. The signal processing device 170 may display a thumbnail list including a plurality of thumbnail images on the display 180 using received thumbnail images.

The thumbnail list may be displayed in a brief viewing manner in which the thumbnail list is displayed in a portion of the display 180 on which an image is being displayed or in a full viewing manner in which the thumbnail list is displayed over most of the display 180. Thumbnail images in the thumbnail list may be sequentially updated.

The display 180 generates drive signals by converting an image signal, a data signal, an on-screen display (OSD) signal, and a control signal processed by the signal processing device 170 or an image signal, a data signal, and a control signal received from the external device interface 130.

The display 180 may be a plasma display panel (PDP), a liquid crystal display (LCD), an organic light emitting diode (OLED) display, a flexible display, or a 3D display. For 3D image viewing, the display 180 may be divided into a supplementary display type and a single display type.

In the single display type, a 3D image may be implemented on the display 180 alone without a separate subsidiary device, e.g., glasses. Examples of the single display type may include various types such as a lenticular type and a parallax barrier type.

In the supplementary display type, 3D imagery may be implemented using a subsidiary device as a viewing device (not shown), in addition to the display 180. Examples of the supplementary display type may include various types such as a head-mounted display (HMD) type and a glasses type.

The glasses type may be divided into a passive type such as a polarized glasses type and an active type such as a shutter glasses type. The HMD type may be divided into a passive type and an active type.

The viewing device (not shown) may be 3D glasses that enable 3D image viewing. The 3D glasses (not shown) may be passive-type polarized glasses or active-type shutter glasses. The 3D glasses may also be understood as conceptually including the HMD type.

The display 180 may include a touchscreen and may function as an input device as well as an output device.

The audio output device 185 receives an audio signal processed by the signal processing device 170 and outputs audio.

A capture device (not shown) captures an image of the user. The capture device (not shown) may be implemented using one camera. However, embodiments of the present disclosure are not limited thereto and the capture device (not shown) may be implemented using a plurality of cameras. The capture device (not shown) may be buried in the upper portion of the display 180 of the image display apparatus 100 or may be separately disposed. Information about the image captured by the capture device (not shown) may be input to the signal processing device 170.

The signal processing device 170 may sense user gestures based on the image captured by the capture device (not shown), the signal sensed by the sensor device (not shown), or a combination thereof.

The power supply 190 supplies power to overall parts of the image display apparatus 100. In particular, the power supply 190 may supply power to the signal processing device 170, which may be implemented in the form of system-on-chip (SOC), the display 180 for displaying images, and the audio output device 185 for outputting audio signals.

Specifically, the power supply 190 may include a converter for converting alternating current (AC) power into direct current (DC) power and a DC-DC converter for changing the level of the DC power.

The remote control device 200 transmits a user input signal to the user input interface 150. To this end, the remote control device 200 may use Bluetooth, RF communication, infrared (IR) communication, ultra-wideband (UWB), or ZigBee. In addition, the remote control device 200 may receive an image signal, an audio signal, or a data signal from the user input interface 150 and then display or audibly output the received signal.

The image display apparatus 100 may be a fixed or mobile digital broadcast receiver capable of receiving a digital broadcast.

FIG. 2 is a block diagram of the image display apparatus 100 according to an embodiment of the present disclosure.

Some of the constituents of the image display apparatus shown in the diagram may be combined or omitted or other constituents may be added thereto, according to specifications of the image display apparatus 100 as actually implemented. That is, two or more constituents of the image display apparatus 100 may be combined into one constituent or one constituent thereof may be subdivided into two or more constituents, as needed. In addition, a function performed in each block is simply illustrative and specific operations or units of the block do not limit the scope of the present disclosure.

Meanwhile, the image display apparatus 100 may not include the tuner 110 and the demodulator 120 as opposed to FIG. 2. Instead, the image display apparatus 100 may receive and reproduce image content through the network interface 135 or the external device interface 130.

The image display apparatus 100 is an exemplary image signal processing apparatus for processing signals of images stored therein or signals of input images. Another example of the image signal processing apparatus may be the above-described set-top box, DVD player, Blu-ray player, game console, or computer except for the display 180 and the audio output device 185 shown in FIG. 2.

Figure 3:
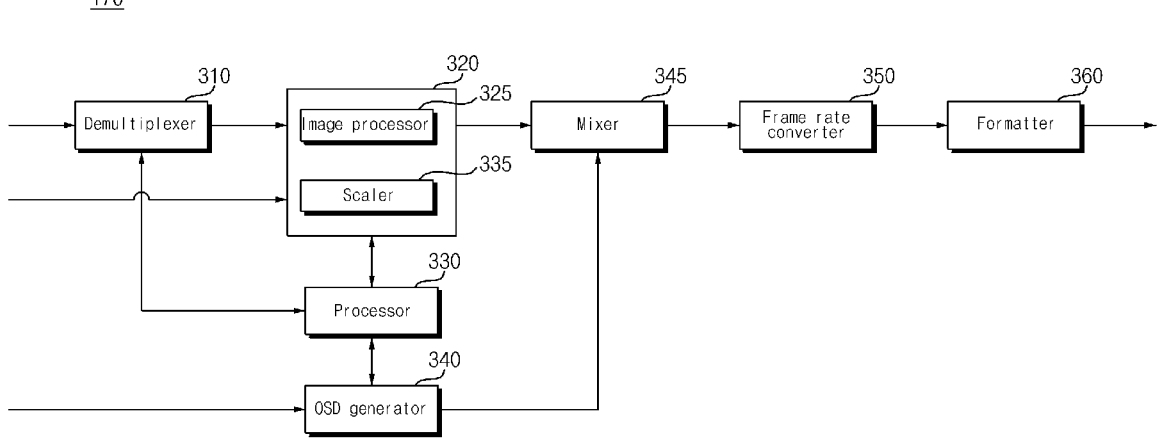
FIG. 3 is an internal block diagram of a controller of the image display apparatus of FIG. 2.

FIG. 3 is an internal block diagram of the controller shown in FIG. 2.

Referring to FIG. 3, the signal processing device 170 according to an embodiment of the present disclosure may include a demultiplexer 310, an image processor 320, a processor 330, an OSD generator 340, a mixer 345, a frame rate converter 350, and a formatter 360. The signal processing device 170 may further include an audio processor (not shown) and a data processor (not shown).

The demultiplexer 310 demultiplexes an input TS signal. For example, in case in which an MPEG-2 TS signal is input, the demultiplexer 310 may demultiplex the MPEG-2 TS signal into an image signal, an audio signal, and a data signal. Herein, the TS signal input to the demultiplexer 310 may be a TS signal output from the tuner 110, the demodulator 120, or the external device interface 130.

The image processor 320 may perform image processing on the demultiplexed image signal. To this end, the image processor 320 may include an image decoder 325 and a scaler 335.

The image decoder 325 decodes the demultiplexed image signal and the scaler 335 scales the resolution of the decoded image signal for outputting the image signal through the display 180.

The image decoder 325 may include various types of decoders.

The image signal decoded by the image processor 320 may include a 2D image signal alone, a mixture of a 2D image signal and a 3D image signal, or a 3D image signal alone.

For example, an external image signal received from an external device or a broadcast image signal of a broadcast signal received through the tuner 110 may include the 2D image signal alone, a mixture of the 2D image signal and the 3D image signal, or the 3D image signal alone. Accordingly, the signal processing device 170, more specifically, the image processor 320, may perform signal processing upon the external image signal or the broadcast image signal to output the 2D image signal, a mixture of the 2D image signal and the 3D image signal, or the 3D image signal.

The image signal decoded by the image processor 320 may include a 3D image signal in various formats. For example, the decoded image signal may be a 3D image signal that includes a color difference image and a depth image or a 3D image signal that includes multi-viewpoint image signals. The multi-viewpoint image signals may include a left-eye image signal and a right-eye image signal, for example.

The formats of the 3D image signal may include a side-by-side format in which the left-eye image L and the right-eye image R are arranged in a horizontal direction, a top/down format in which the left-eye image and the right-eye image are arranged in a vertical direction, a frame sequential format in which the left-eye image and the right-eye image are arranged in a time division manner, an interlaced format in which the left-eye image and the right-eye image are mixed in lines, and a checker box format in which the left-eye image and the right-eye image are mixed in each box.

The processor 330 may control overall operation of the image display apparatus 100 or the signal processing device 170. For example, the processor 330 may control the tuner 110 to tune to an RF broadcasting corresponding to a channel selected by the user or a prestored channel.

In addition, the processor 330 may control the image display apparatus 100 according to a user command input through the user input interface 150 or according to an internal program.

The processor 330 may control data transmission to the network interface 135 or the external device interface 130.

The processor 330 may control operations of the demultiplexer 310, image processor 320 and OSD generator 340 in the signal processing device 170.

The OSD generator 340 generates an OSD signal autonomously or according to a user input signal. For example, the OSD generator 340 may generate a signal for displaying a variety of information in the form of graphics or texts on the screen of the display 180 based on a user input signal. The generated OSD signal may include a variety of data such as a user interface screen, various menu screens, a widget, and an icon of the image display apparatus 100. The generated OSD signal may also include a 2D object or a 3D object.

The OSD generator 340 may generate a pointer which can be displayed on the display, based on a pointing signal input from the remote control device 200. In particular, the pointer may be generated by a pointing signal processor (not shown) and the OSD generator 240 may include the pointing signal generator (not shown). Obviously, it is possible to provide the pointing signal processor (not shown) separately from the OSD generator 240.

The mixer 345 may mix the OSD signal generated by the OSD generator 340 with the image signal decoded by the image processor 320. Each of the OSD signal and the decoded image signal may include at least one of a 2D signal or a 3D signal. The mixed image signal is provided to the frame rate converter 350.

The frame rate converter (FRC) 350 may convert the frame rate of an input image. The FRC 350 may also directly output the input image without frame rate conversion.

The formatter 360 may arrange a left-eye image frame and right-eye image frame of the 3D image produced through frame rate conversion. The formatter 360 may output a synchronization signal Vsync to open a left-eye glass or right-eye glass of a 3D viewing apparatus (not shown).

The formatter 360 may receive the mixed signal, i.e., a mixture of the OSD signal and the decoded image signal, from the mixer 345 and separate the mixed signal into a 2D image signal and a 3D image signal.

The formatter 360 may change the format of the 3D image signal. For example, the formatter 360 may change the format of the 3D image signal to any of the various formats described above.

The formatter 360 may convert the 2D image signal into the 3D image signal. For example, the formatter 360 may detect an edge or a selectable object in the 2D image signal and separate and generate an object according to the detected edge or the selectable object as the 3D image signal, based on a 3D image generation algorithm. In this case, the generated 3D image signal may be separated into the left-eye image signal L and the right-eye image signal R to be aligned, as described above.

Although not shown in the figure, a 3D processor (not shown) for 3-D effect signal processing may be further disposed after the formatter 360. The 3D processor (not shown) may perform processing such as adjustment of brightness, tint, and color of an image signal to improve a 3D effect. For example, the 3D processor may perform signal processing of making parts at a close distance clear and making parts at a far distance blurry. Such functions of the 3D processor may be integrated into the formatter 360 or the image processor 320.

An audio processor (not shown) in the signal processing device 170 may process the demultiplexed audio signal. To this end, the audio processor (not shown) may include various decoders.

The audio processor (not shown) in the signal processing device 170 may perform processing such as adjustment of bass, treble, and volume.

The data processor (not shown) in the signal processing device 170 may perform data processing on the demultiplexed data signal. For example, if the demultiplexed data signal is a coded data signal, the data processor (not shown) may decode the data signal. The coded data signal may be EPG information containing broadcast information such as a start time and end time of a broadcast program broadcast on each channel.

Although the formatter 360 performs 3D processing after the mixer 345 mixes the signals received from the OSD generator 340 and the image processor 320 in FIG. 3, embodiments of the present disclosure are not limited thereto and the mixer 345 may be disposed after the formatter 360. That is, after the formatter 360 performs 3D processing on the output of the image processor 320 and the OSD generator 340 generates the OSD signal and performs 3D processing, the mixer 345 may mix the 3D processed signals.

The block diagram of the signal processing device 170 shown in FIG. 3 is simply illustrative. Constituents of the block diagram may be integrated, added or omitted according to the specifications of the signal processing device 170 as actually implemented.

In particular, the frame rate converter 350 and the formatter 360 may not be provided in the signal processing device 170. Instead, they may be provided individually or provided as one separate module.

Figure 4:
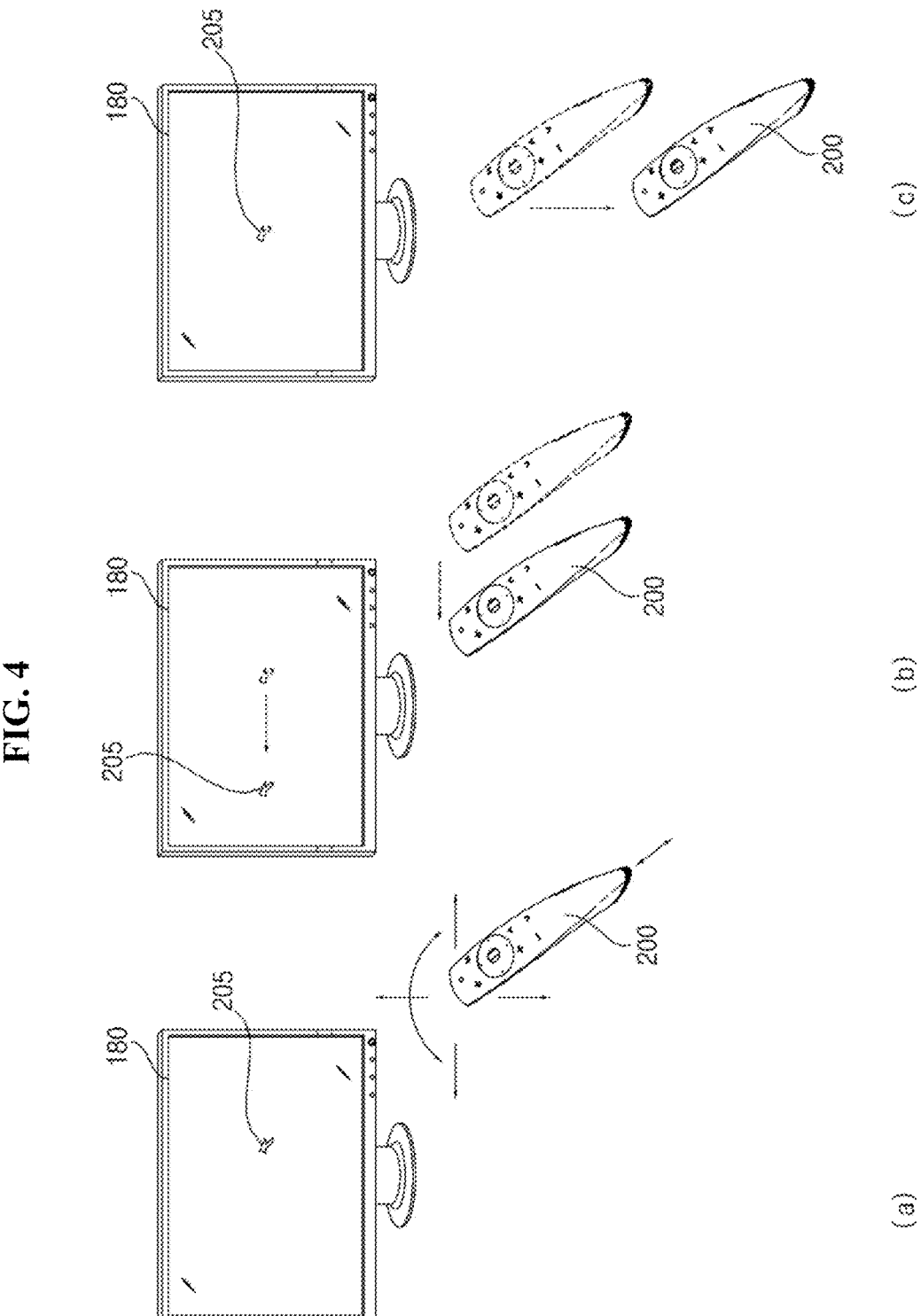
FIG. 4 is a view illustrating a method of controlling a remote control device of the image display apparatus of FIG. 2.

FIG. 4 is a view illustrating a method of controlling the remote control device shown in FIG. 2.

As shown in FIG. 4(*a*), a pointer 205 corresponding to the remote control device 200 may be displayed on the display 180.

A user may move the remote control device 200 up and down, left and right (FIG. 4(*b*)), or back and forth (FIG. 4(*c*)) or rotate the same. The pointer 205 displayed on the display 180 of the image display apparatus moves according to movement of the remote control device 200. As shown in the figure, since the pointer 205 moves according to movement of the remote control device 200 in a 3D space, the remote control device 200 may be referred to as a spatial remote control device or a 3D pointing device.

FIG. 4(*b*) illustrates a case in which the pointer 205 displayed on the display 180 moves to the left in case in which the user moves the remote control device 200 to the left.

Information about movement of the remote control device 200 sensed through a sensor of the remote control device 200 is transmitted to the image display apparatus. The image display apparatus may calculate coordinates of the pointer 205 based on the information about the movement of the remote control device 200. The image display apparatus may display the pointer 205 such that the pointer 205 corresponds to the calculated coordinates.

FIG. 4(*c*) illustrates a case in which the user moves the remote control device 200 away from display 180 while pressing down a specific button on the remote control device 200. In this case, a selected area on the display 180 corresponding to the pointer 205 may be zoomed in and displayed with a magnified size. On the contrary, in case in which the user moves the remote control device 200 closer to the display 180, the selected area may be zoomed out and displayed with a reduced size. Alternatively, the selected area may be zoomed out in case in which the remote control device 200 is moved away from the display 180 and may be zoomed in in case in which the remote control device 200 is moved closer to the display 180.

Up-and-down and left-and-right movements of the remote control device 200 may not be recognized while the specific button on the remote control device 200 is pressed down. That is, in case in which the remote control device 200 moves away from the display 180 or approaches the display 180, the up-and-down and left-and-right movements of the remote control device 200 may not be recognized and only a back-and-forth movement of the remote control device 200 may be recognized. If the specific button on the remote control device 200 is not pressed down, only the pointer 205 moves according to the up-and-down and left-and-right movements of the remote control device 200.

The speed and direction of movement of the pointer 205 may correspond to the speed and direction of movement of the remote control device 200.

Figure 5:
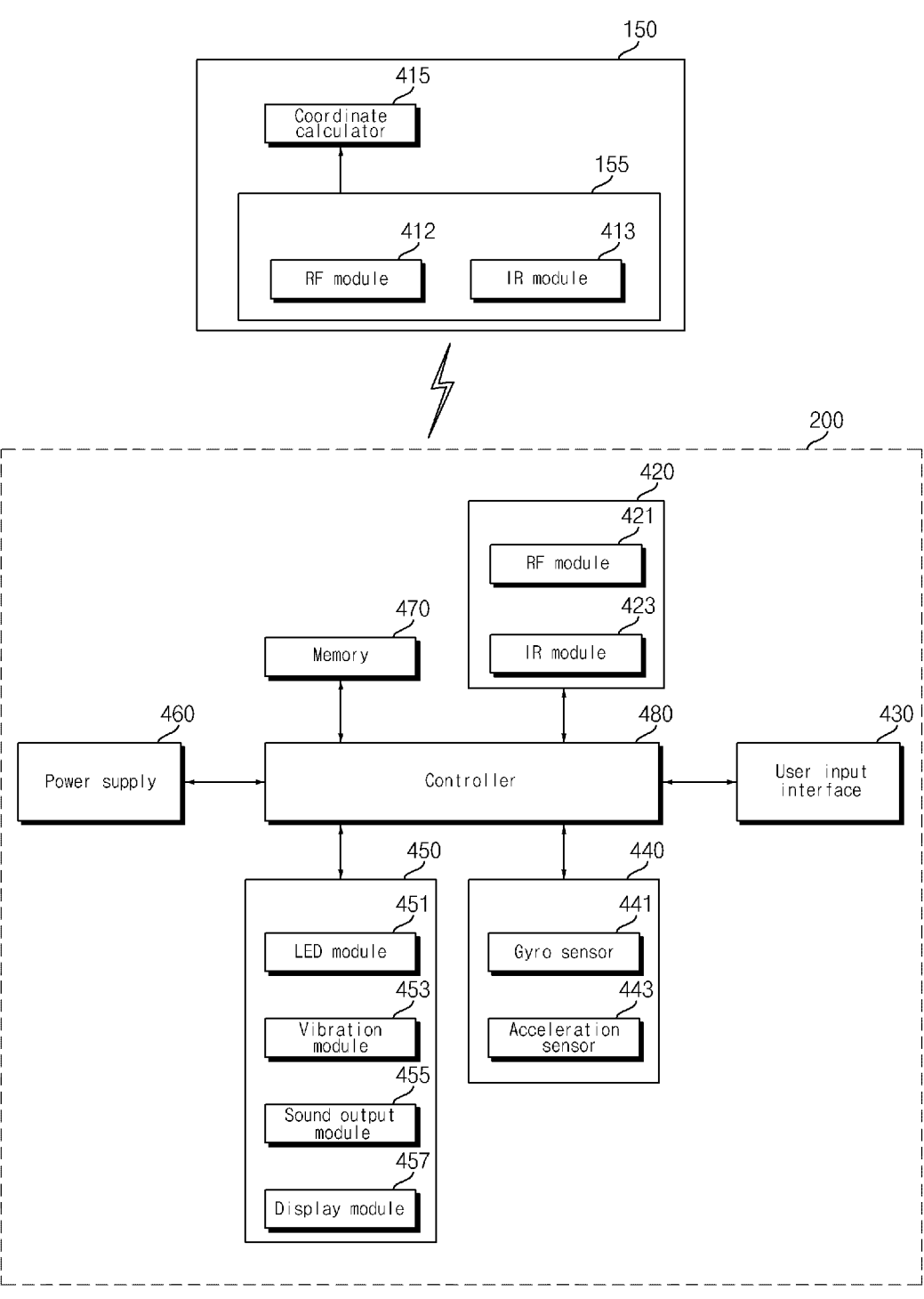
FIG. 5 is an internal block diagram of the remote control device of the image display apparatus of FIG. 2.

FIG. 5 is an internal block diagram of the remote control device shown in FIG. 2.

Referring to FIG. 5, the remote control device 200 may include a wireless transceiver 420, a user input interface 430, a sensor device 440, an output device 450, a power supply 460, a memory 470, and a controller 480.

The wireless transceiver 420 transmits and receives signals to and from one of the image display apparatuses according to embodiments of the present disclosure described above. Hereinafter, one image display apparatus 100 among the image display apparatuses according to embodiments of the present disclosure will be described by way of example.

In this embodiment, the wireless transceiver 420 may include an RF module 421 capable of transmitting and receiving signals to and from the image display apparatus 100 according to an RF communication standard. The wireless transceiver 420 may further include an IR module 423 capable of transmitting and receiving signals to and from the image display apparatus 100 according to an IR communication standard.

In this embodiment, the remote control device 200 transmits a signal containing information about movement of the remote control device 200 to the image display apparatus 100 via the RF module 421.

In addition, the remote control device 200 may receive a signal from the image display apparatus 100 via the RF module 421. As needed, the remote control device 200 may transmit commands related to power on/off, channel change, and volume change to the image display apparatus 100 via the IR module 423.

The user input interface 430 may include a keypad, buttons, a touchpad, or a touchscreen. The user may input a command related to the display apparatus 100 to the remote control device 200 by manipulating the user input interface 430. If the user input interface 430 includes a hard key button, the user may input a command related to the image display apparatus 100 to the remote control device 200 by pressing the hard key button. If the user input interface 430 includes a touchscreen, the user may input a command related to the image display apparatus 100 to the remote control device 200 by touching a soft key on the touchscreen. The user input interface 430 may include various types of input means such as a scroll key and a jog key which can be manipulated by the user and this embodiment does not limit the scope of the present disclosure.

The sensor device 440 may include a gyro sensor 441 or an acceleration sensor 443. The gyro sensor 441 may sense information about movement of the remote control device 200.

For example, the gyro sensor 441 may sense information about movement of the remote control device 200 with respect to the X, Y and Z axes. The acceleration sensor 443 may sense information about the movement speed of the remote control device 200. The sensor device 440 may further include a distance measurement sensor to sense a distance to the display 180.

The output device 450 may output an image signal or audio signal corresponding to manipulation of the user input interface 435 or the signal transmitted by the image display apparatus 100. The user may recognize, via the output device 450, whether the user input interface 435 is manipulated or the image display apparatus 100 is controlled.

For example, the output device 450 may include an LED module 451 to be turned on, a vibration module 453 to generate vibration, a sound output module 455 to output sound, or a display module 457 to output an image, in case in which the user input interface 435 is manipulated or signals are transmitted to and received from the image display apparatus 100 via the wireless transceiver 425.

The power supply 460 supplies power to the remote control device 200. If the remote control device 200 does not move for a predetermined time, the power supply 460 may stop supplying power to reduce waste of power. The power supply 460 may resume supply of power in case in which a predetermined key provided to the remote control device 200 is manipulated.

The memory 470 may store various types of programs and application data necessary for control or operation of the remote control device 200. In case in which the remote control device 200 wirelessly transmits and receives signals to and from the image display apparatus 100 via the RF module 421, the remote control device 200 and the image display apparatus 100 may transmit and receive signals in a predetermined frequency band. The controller 480 of the remote control device 200 may store, in the memory 470, information about a frequency band enabling wireless transmission and reception of signals to and from the image display apparatus 100 which is paired with the remote control device 200, and reference the information.

The controller 480 controls overall operation related to control of the remote control device 200. The controller 480 may transmit a signal corresponding to manipulation of a predetermined key in the user input interface 435 or a signal corresponding to movement of the remote control device 200 sensed by the sensor device 440 to the image display apparatus 100 via the wireless transceiver 425.

The user input interface 150 of the image display apparatus 100 may include a wireless transceiver 151 capable of wirelessly transmitting and receiving signals to and from the remote control device 200 and a coordinate calculator 415 capable of calculating coordinate values of a pointer corresponding to operation of the remote control device 200.

The user input interface 150 may wirelessly transmit/receive signals to/from the remote control device 200 through an RF module 412 in the communication device 155. Further, the user input interface 150 may receive a signal transmitted by the remote control device 200 according to an IR communication standard through an IR module 413 in the communication device 155.

The coordinate calculator 415 may calculate a coordinate value (x, y) of the pointer 205 to be displayed on the display 180 by correcting hand shaking or errors in a signal corresponding to operation of the remote control device 200, which is received via the wireless transceiver 411.

The signal which is transmitted by the remote control device 200 and input to the image display apparatus 100 via the user input interface 150 is transmitted to the signal processing device 170 of the image display apparatus 100. The signal processing device 170 may determine information about an operation of the remote control device 200 or manipulation of a key from the signal transmitted by the remote control device 200 and control the image display apparatus 100 based on the information.

As another example, the remote control device 200 may calculate a coordinate value of a pointer corresponding to movement thereof and output the coordinate value to the user input interface 150 of the image display apparatus 100. In this case, the user input interface 150 of the image display apparatus 100 may transmit, to the signal processing device 170, information about the received coordinate value of the pointer without separately correcting hand tremor or errors.

As another example, the coordinate calculator 415 may be provided in the signal processing device 170 rather than in the user input interface 150 as opposed to FIG. 5.

Figure 6A:
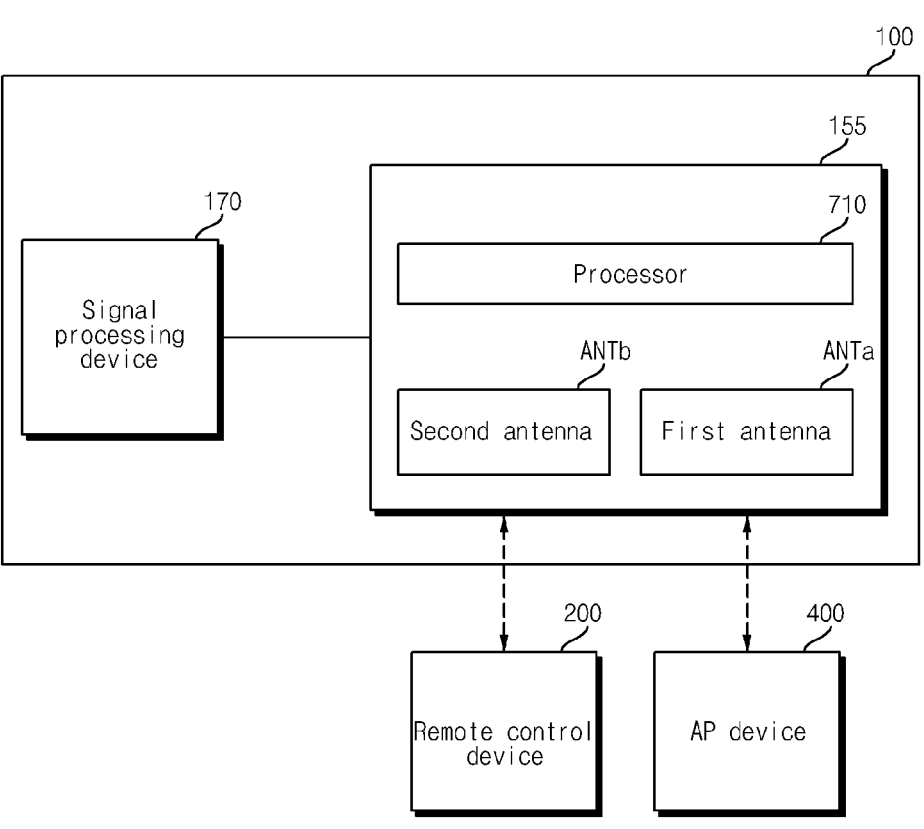
FIG. 6A is an example of an internal block diagram of a communication device according to an embodiment of the present disclosure.

FIG. 6A is an example of an internal block diagram of a communication device according to an embodiment of the present disclosure.

Referring to the figure, the communication device 155 according to an embodiment of the present disclosure includes a first antenna ANTa for receiving or transmitting a wireless signal of the first communication standard, a second antenna ANTb for receiving or transmitting a wireless signal of the second communication standard, and a processor 710 for processing a signal from the first antenna ANTa or the second antenna ANTb and processing the signal or transmitting a processed signal to the first antenna ANTa or the second antenna ANTb.

The first antenna ANTa may receive/transmit a wireless signal of the first communication standard from/to the access point device 400.

The second antenna ANTb may receive/transmit a wireless signal of the first communication standard from/to the remote control device 200 or the mobile terminal 600.

The first communication standard may be a Wi-Fi communication standard, and the second communication standard may be a Bluetooth communication standard.

The frequency band of the Wi-Fi communication standard may be a dual band of about 2.4 GHz and 5 GHz, and the frequency band of the Bluetooth communication standard may be about 2.4 GHz.

In particular, in case in which the communication device 155 receives a remote control signal based on the Bluetooth communication standard during information transmission from the access point device 400 in a band of approximately 2.4 GHz according to the Wi-Fi communication standard, reception of the remote control signal based on the Bluetooth communication standard may become unstable.

Accordingly, in the embodiment of the present disclosure, a method of lowering the power at the time wireless signal transmission based on the second communication standard is adopted in order to stably receive the wireless signal of the second communication standard.

That is, in case in which the second antenna ANTb receives a wireless signal while the first antenna ANTa wirelessly receives first data and wirelessly transmits information related to the first data with a first power, the processor 710 in the communication device 155 according to the embodiment of the present disclosure controls the information related to the first data to be wirelessly transmitted with a second power lower than the first power.

Accordingly, it is possible to stably secure wireless reception performance during wireless communication based on a plurality of communication standards. In particular, it is possible to stably receive a wireless signal based on the second communication standard during data transmission based on the first communication standard and wireless signal reception based on the second communication standard.

Meanwhile, the processor 710 in the communication device 155 is electrically connected to the signal processing device 170.

For example, in case in which the second antenna ANTb receives a wireless signal while the first antenna ANTa wirelessly receives content data, which is the first data, and wirelessly transmits information related to the content data with the first power, the processor 710 may control the information related to the content data to be wirelessly transmitted with the second power lower than the first power. Accordingly, it is possible to stably receive a wireless signal based on the second communication standard.

Figure 6B:
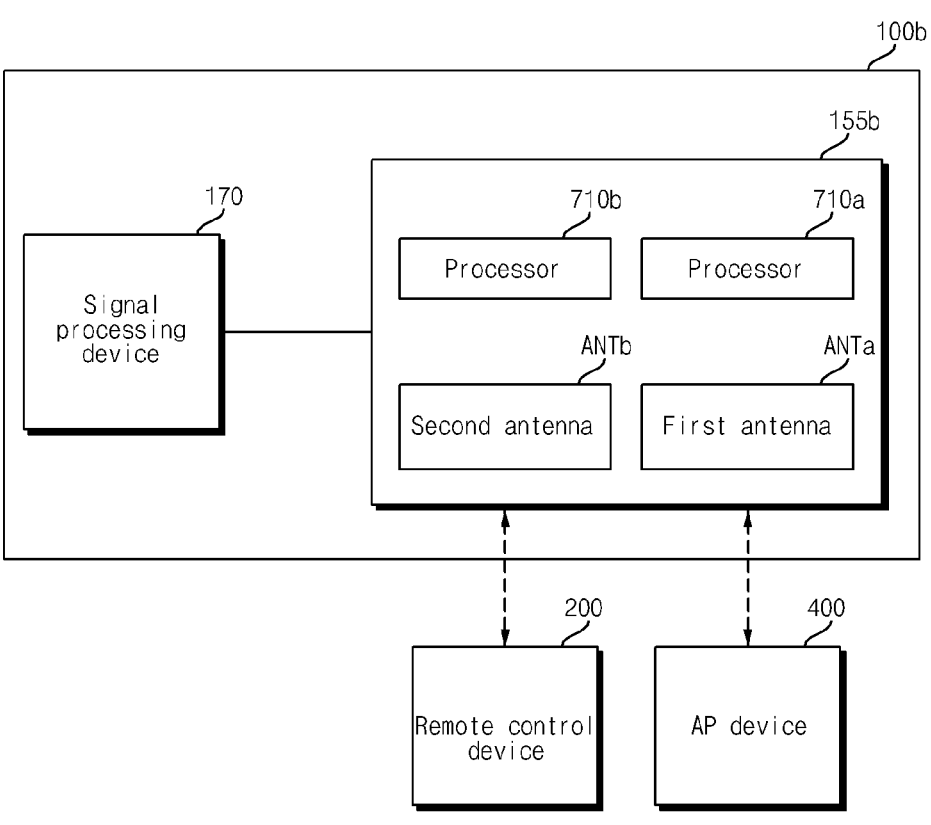
FIG. 6B is another example of an internal block diagram of a communication device according to an embodiment of the present disclosure.

FIG. 6B is another example of an internal block diagram of a communication device according to an embodiment of the present disclosure.

Referring to the figure, the communication device 155b of FIG. 6B is similar to the communication device 155 of FIG. 6A but differs from the communication device 155 in that a first processor 710a and a second processor 710b are provided in the communication device 155b.

The first processor 710a may be electrically connected to the first antenna ANTa to receive and process a signal from the first antenna ANTa or transmit a processed signal to the first antenna ANTa.

The second processor 710b may receive and process a signal from the second antenna ANTb or transmit a processed signal to the second antenna ANTb.

Meanwhile, in case in which the second antenna ANTb receives a wireless signal while the first antenna ANTa wirelessly receives first data and wirelessly transmits information related to the first data with the first power, the processor 710a in the communication device 155b may control the information related to the first data to be wirelessly transmitted with the second power lower than the first power.

Accordingly, it is possible to stably secure wireless reception performance while performing wireless communication based on a plurality of communication standards. In particular, it is possible to stably receive a wireless signal based on the second communication standard during data transmission based on the first communication standard and wireless signal reception based on the second communication standard.

FIGS. 7A to 8C are views referred to in description of FIG. 6A.

First, FIGS. 7A to 7D are views illustrating various operations of the communication device 155 of FIG. 6A.

Figure 7A:
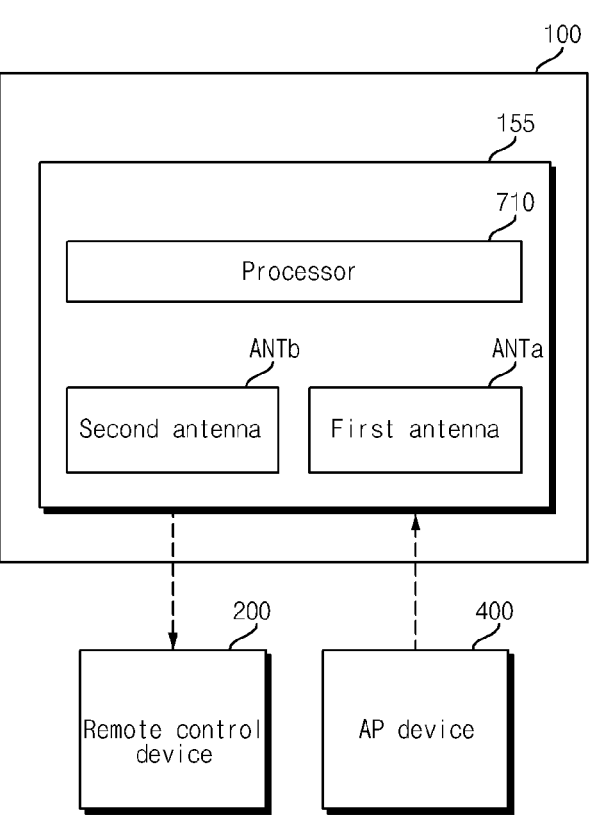
FIGS. 7A to 8C are views referred to in description of FIG. 6A.

FIG. 7A shows that the first antenna ANTa in the communication device 155 receives a wireless signal of the first communication standard from the access point device 400, and the second antenna ANTb transmits a wireless signal of the second communication standard to the remote control device 200.

Figure 7B:
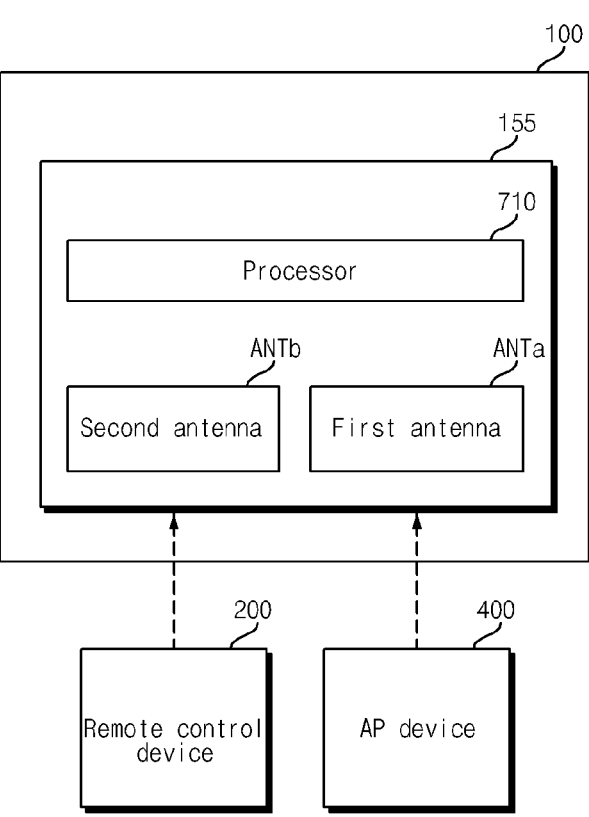

FIG. 7B shows that the first antenna ANTa in the communication device 155 receives a wireless signal of the first communication standard from the access point device 400, and the second antenna ANTb receives a wireless signal from the remote control device 200.

Figure 7C:
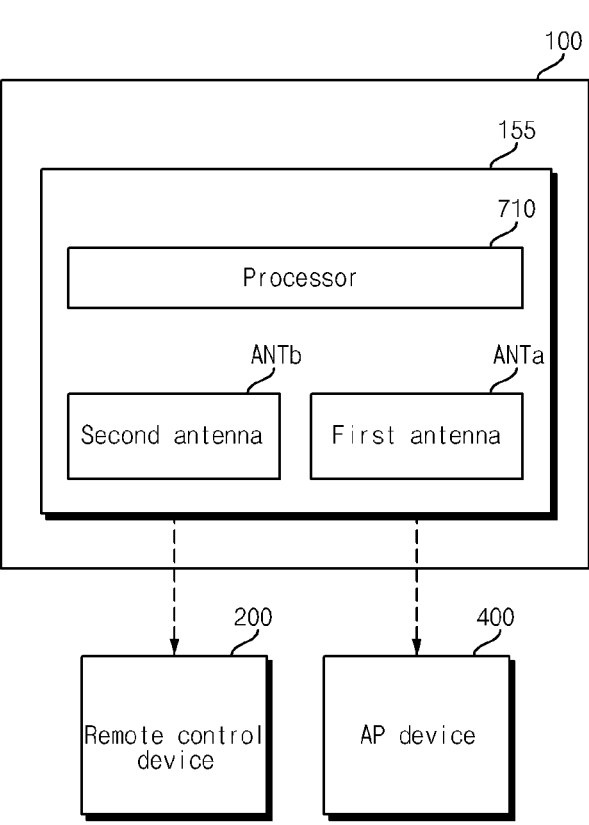

FIG. 7C shows that the first antenna ANTa in the communication device 155 transmits a wireless signal of the first communication standard to the access point device 400, and the second antenna ANTb transmits a wireless signal of the second communication standard to the remote control device 200.

Figure 7D:
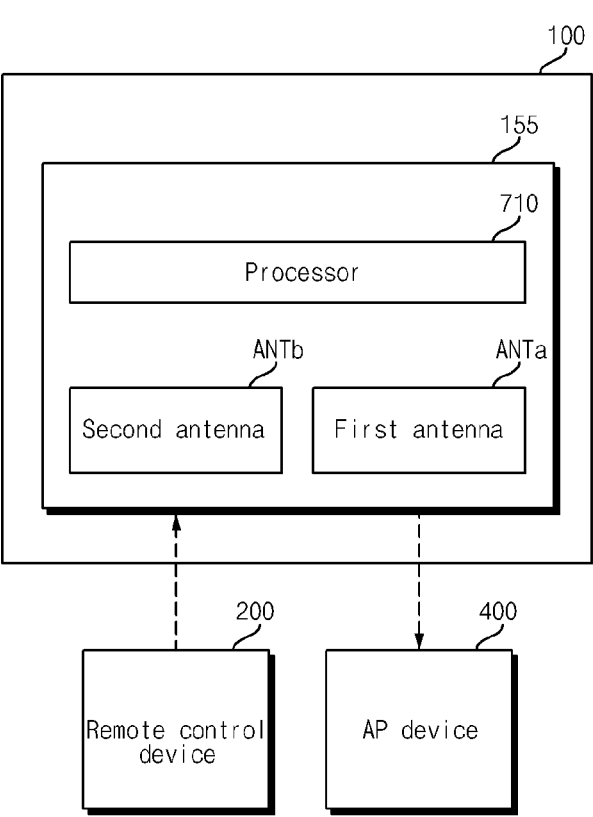

FIG. 7D shows that the first antenna ANTa in the communication device 155 transmits a wireless signal of the first communication standard to the access point device 400, and the second antenna ANTb receives a wireless signal of the second communication standard from the remote control device 200.

Figure 8A:
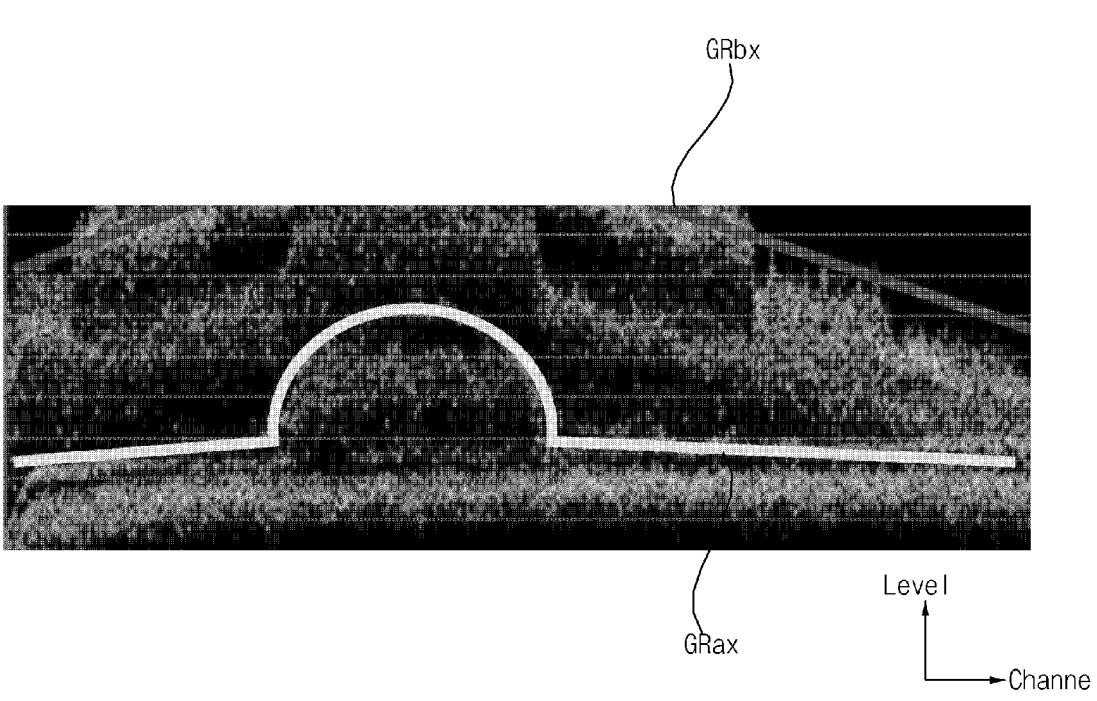

FIG. 8A is a view illustrating wireless power in case in which the communication device 155 transmits a wireless signal of the first communication standard and receives a wireless signal of the second communication standard, as in FIG. 7D.

Referring to the figure, the power of the wireless signal of the second communication standard may be represented as GRax, and the power of the wireless signal of the first communication standard may be represented as GRbx, which is much greater than GRax.

That is, the power of the wireless signal of the first communication standard appears to be considerably high over the frequency channel of the horizontal axis.

Figure 8B:
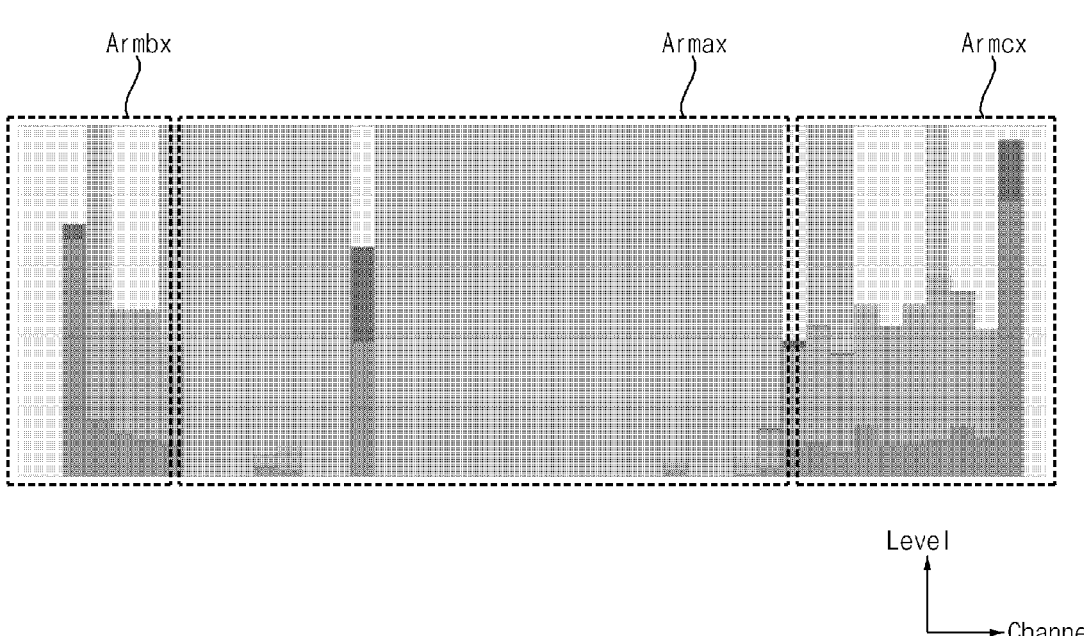

FIG. 8B is a view illustrating states for frequency channels in case in which a wireless signal of the second communication standard is received, as in FIG. 7D.

Referring to the figure, in case in which the communication device 155 transmits a wireless signal of the first communication standard and receives a wireless signal of the second communication standard, as shown in FIG. 7D, a frequency channel of a central region Armax among frequency channels of the second communication standard may have no channel margin due to the power of the wireless signal of the first communication standard.

Among the frequency channels of the second communication standard, regions Armbx and Armcx on both sides other than the center region Armcx may have a channel margin.

Based on the second communication standard, frequency channel hopping should occur while the communication device 155 receives the wireless signal through the second antenna ANTb. However, hopping can occur only in the regions Armbx and Armcx on both sides other than the center region Armax, as shown in FIG. 8B, and thus wireless signal reception based on the second communication standard becomes unstable.

Figure 8C:
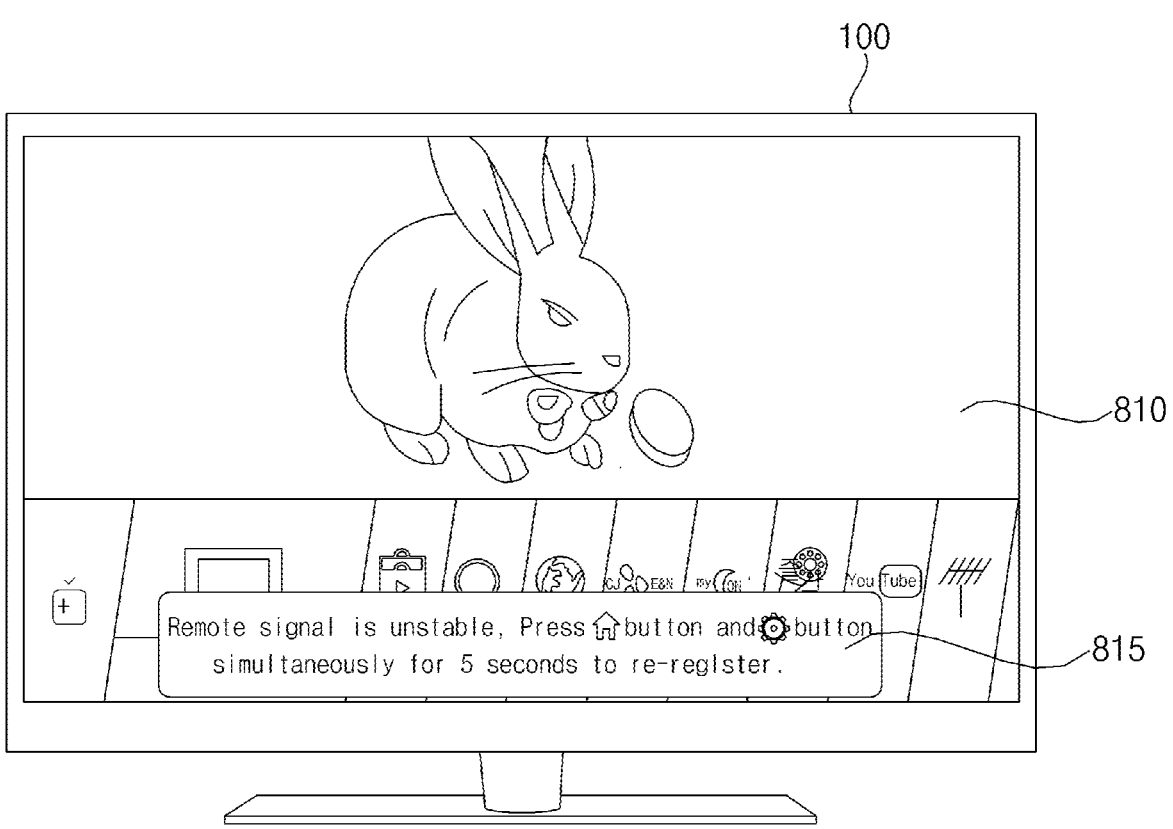

FIG. 8C illustrates output of a notification message 815 indicating wireless signal instability in case in which reception of a wireless signal based on the second communication standard is unstable while the display 810 of the image display apparatus 100 displays a predetermined image 810.

Referring to the figure, the signal processing device 170 of the image display apparatus 100 can control the notification message 815 indicating wireless signal instability to be output in case in which reception of a wireless signal based on the second communication standard is unstable in the communication device 155.

Accordingly, the embodiment of the present disclosure proposes a method for stably receiving a wireless signal based on the second communication standard in case in which transmission of a wireless signal based on the first communication standard and reception of a wireless signal based on the second communication standard are simultaneously performed. This will be described with reference to FIG. 9 and the following figures.

Figure 9:
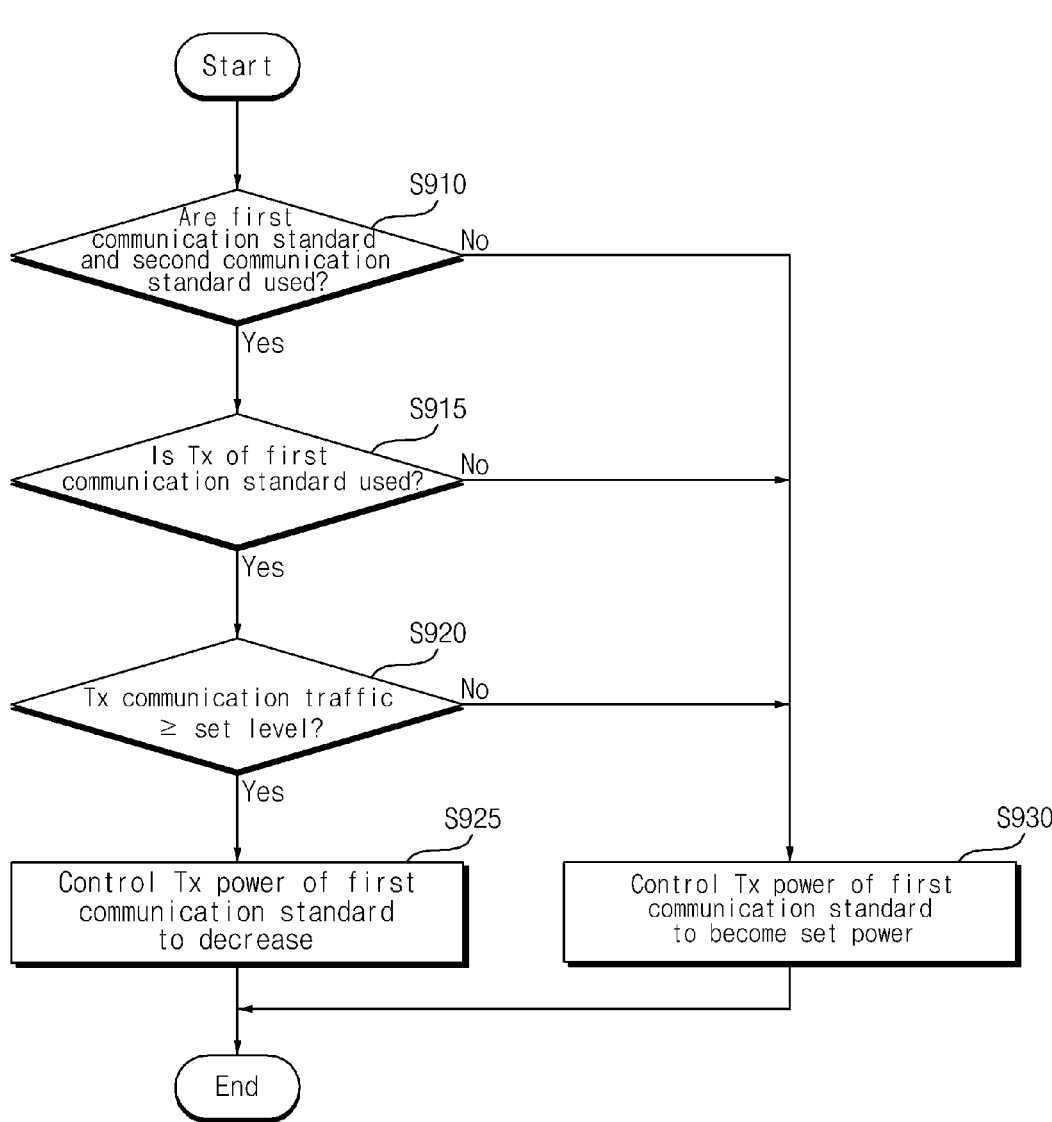
FIG. 9 is a flowchart illustrating a method of operating a communication device according to an embodiment of the present disclosure.

FIG. 9 is a flowchart illustrating a method of operating a communication device according to an embodiment of the present disclosure.

Referring to the figure, the processor 710 in the communication device 155 according to the embodiment of the present disclosure determines whether the first communication standard and the second communication standard are simultaneously used (S910).

If the two communication standards are simultaneously used, the processor 710 in the communication device 155 determines whether transmission based on the first communication standard is performed (S915), determines whether data transmission traffic of communication traffic based on the first communication standard is equal to or greater than a set level if transmission based on the first communication standard is performed (S925), and if the data transmission traffic of communication traffic is equal to or greater than the set level, decrease wireless power at the time of transmitting a wireless signal based on the first communication standard (S925).

That is, in case in which the communication device 155 receives a wireless signal based on the second communication standard while transmitting a wireless signal of the first communication standard, as shown in FIG. 7D, the communication device 155 according to the embodiment of the present disclosure decreases wireless power at the time of transmitting the wireless signal based on the first communication standard in order to reduce the instability of wireless signal reception based on the second communication standard.

Accordingly, it is possible to stably secure wireless reception performance during wireless communication based on a plurality of communication standards. In particular, it is possible to stably receive a wireless signal based on the second communication standard during data transmission based on the first communication standard and wireless signal reception based on the second communication standard.

On the other hand, if wireless signal transmission based on the first communication standard is not performed or the data transmission traffic or communication traffic during wireless signal transmission based on the first communication standard is less than the set level in step 915 or 920, the power at the time of wireless signal transmission according to the communication standard can be controlled to be a set power (S930).

For example, if the data transmission traffic or communication traffic during wireless signal transmission based on the first communication standard is less than the set level during wireless signal reception based on the second communication standard, the processor 710 may control the power at the time of wireless signal transmission based on the first communication standard to be a first power, which is the set power.

In case in which the data transmission traffic or communication traffic during wireless signal transmission based on the first communication standard varies from a level equal to or greater than the set level to a level less than the set level during wireless signal reception based on the second communication standard, there is no significant influence on wireless signal reception based on the second communication standard, and thus the processor 710 may control the power at the time of wireless signal transmission based on the first communication standard to be the first power, which is the set power.

In case in which the data transmission traffic or communication traffic at the time of wireless signal transmission based on the first communication standard is equal to or greater than the set level during wireless signal reception based on the second communication standard, the processor 710 can control the power at the time of wireless signal transmission based on the first communication standard to be the second power lower than the first power. Accordingly, it is possible to stably receive a wireless signal based on the second communication standard.

In case in which a wireless signal based on the second communication standard is received in a state in which the data transmission traffic or communication traffic at the time of wireless signal transmission based on the first communication standard is less than the set level, the power at the time of wireless signal transmission based on the first communication standard can be controlled to be the first power.

Further, in case in which a wireless signal based on the second communication standard is received in a state in which the data transmission traffic or communication traffic at the time of wireless signal transmission based on the first communication standard is equal to or greater than the set level, the processor 710 can control the power at the time of wireless signal transmission based on the first communication standard to be the second power lower than the first power. Accordingly, it is possible to stably receive a wireless signal based on the second communication standard.

Figure 10A:
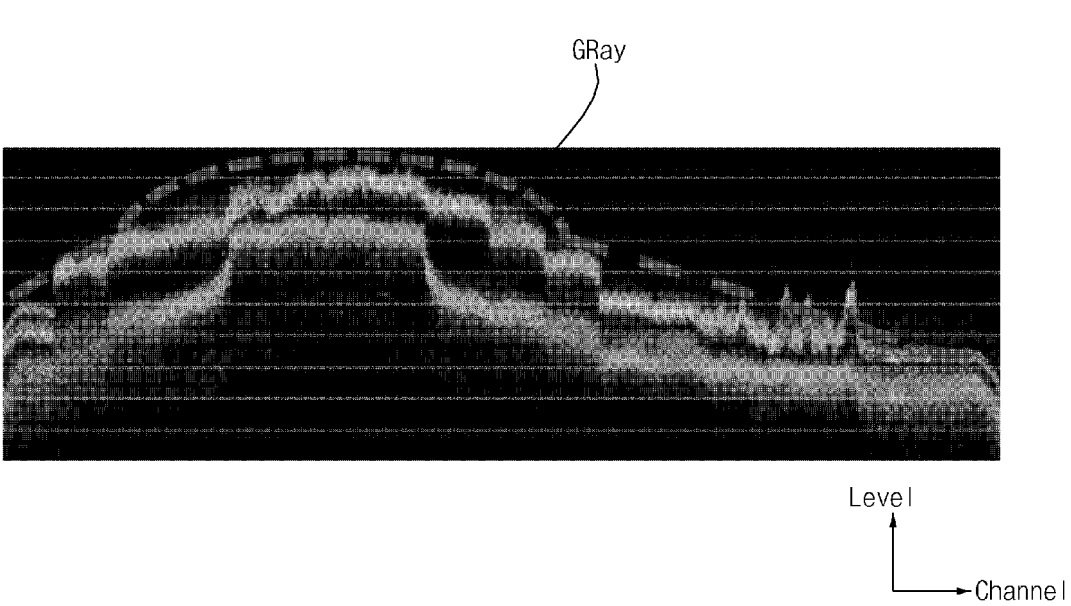
FIGS. 10A to 10C are views referred to in description of FIG. 9.
Figure 10B:
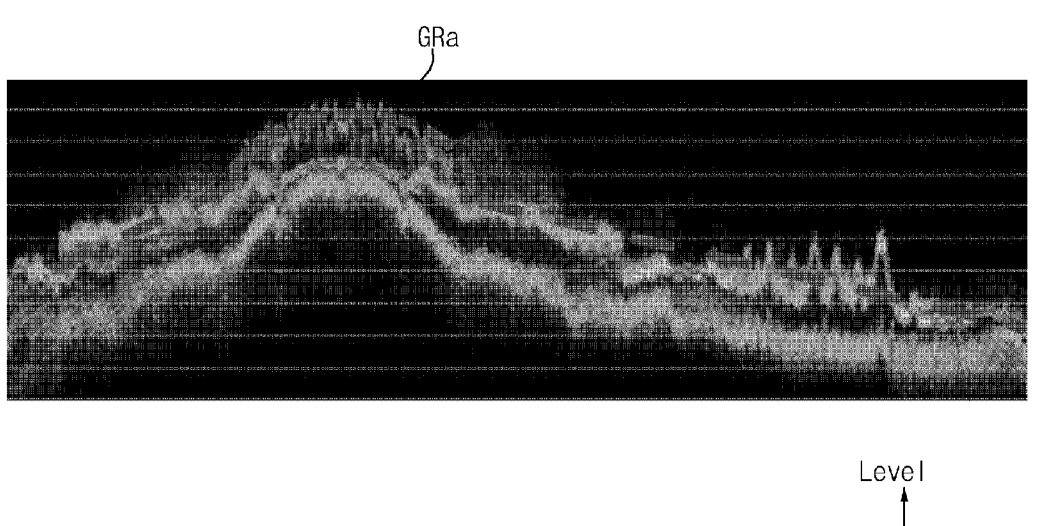
Figure 10C:
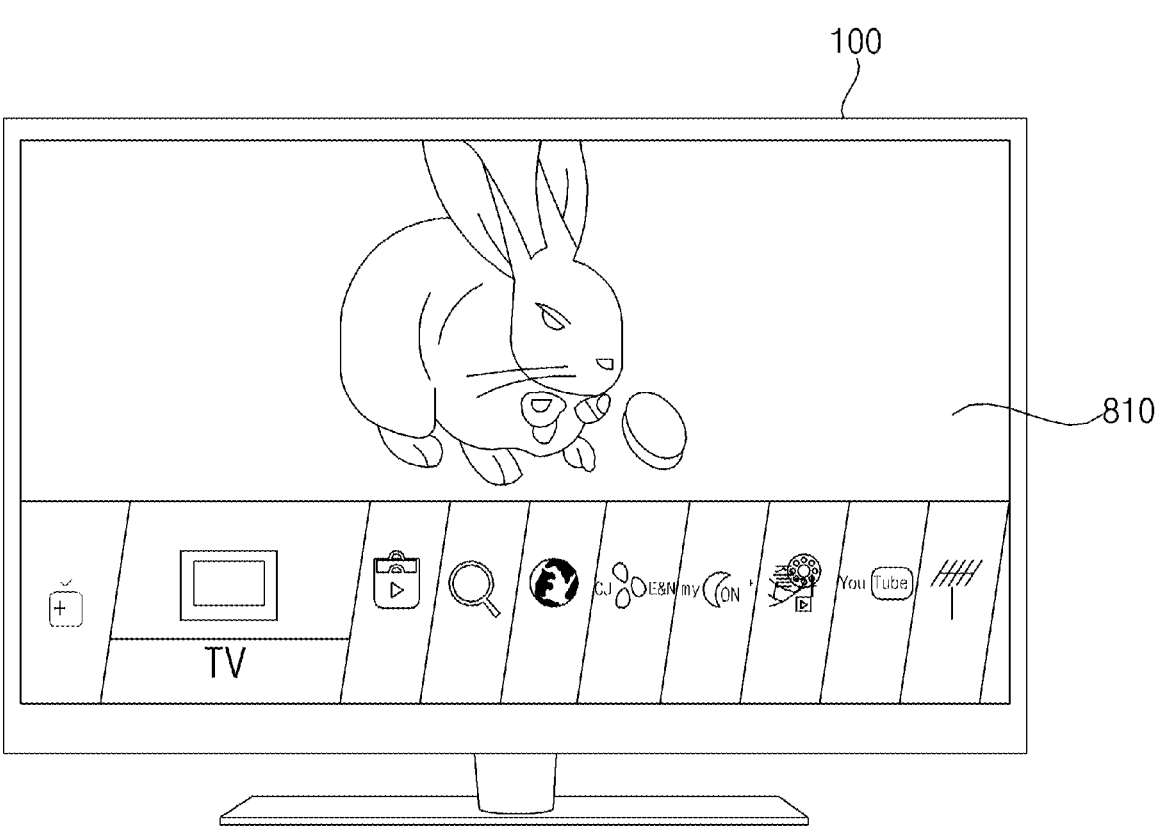

FIGS. 10A to 10C are views referred to in description of FIG. 9.

FIG. 10A is a view illustrating a power graph GRay for each frequency channel in case in which a wireless signal of the first communication standard is transmitted with set power during wireless signal reception based on the second communication standard.

Referring to the figure, it can be ascertained that wireless power is considerably high in various frequency channels in case in which a wireless signal of the first communication standard is transmitted with the set power. Accordingly, wireless signal reception based on the second communication standard becomes unstable.

FIG. 10B is a view illustrating a power graph GRa for each frequency channel in case in which a wireless signal of the first communication standard is transmitted with a power lower than the set power during wireless signal reception based on the second communication standard.

Referring to the figure, it can be ascertained that wireless power is lowered in various frequency channels in case in which a wireless signal of the first communication standard is transmitted with a power lower than the set power. Accordingly, wireless signal reception based on the second communication standard is stably performed.

FIG. 10C shows that the notification message 815 of FIG. 8C disappears in case in which reception of a wireless signal based on the second communication standard is stable while the predetermined image 810 is displayed on the display 180 of the image display apparatus 100 in FIG. 8C.

Referring to the figure, the signal processing device 170 of the image display apparatus 100 can control the notification message 815 indicating wireless signal instability to be output, as shown in FIG. 8C, in case in which a wireless signal is wirelessly transmitted with the first power in a state in which a wireless signal is received through the second antenna ANTb during wireless transmission of information related to a content image through the first antenna ANTa, and can control the notification message 815 indicating wireless signal instability to disappear, as shown in FIG. 10C, in case in which a wireless signal is wirelessly transmitted with the second power lower than the first power in a state in which a wireless signal is received through the second antenna ANTb during wireless transmission of information related to a content image through the first antenna ANTa. Accordingly, it is possible to immediately notify the wireless communication state.

Figure 11:
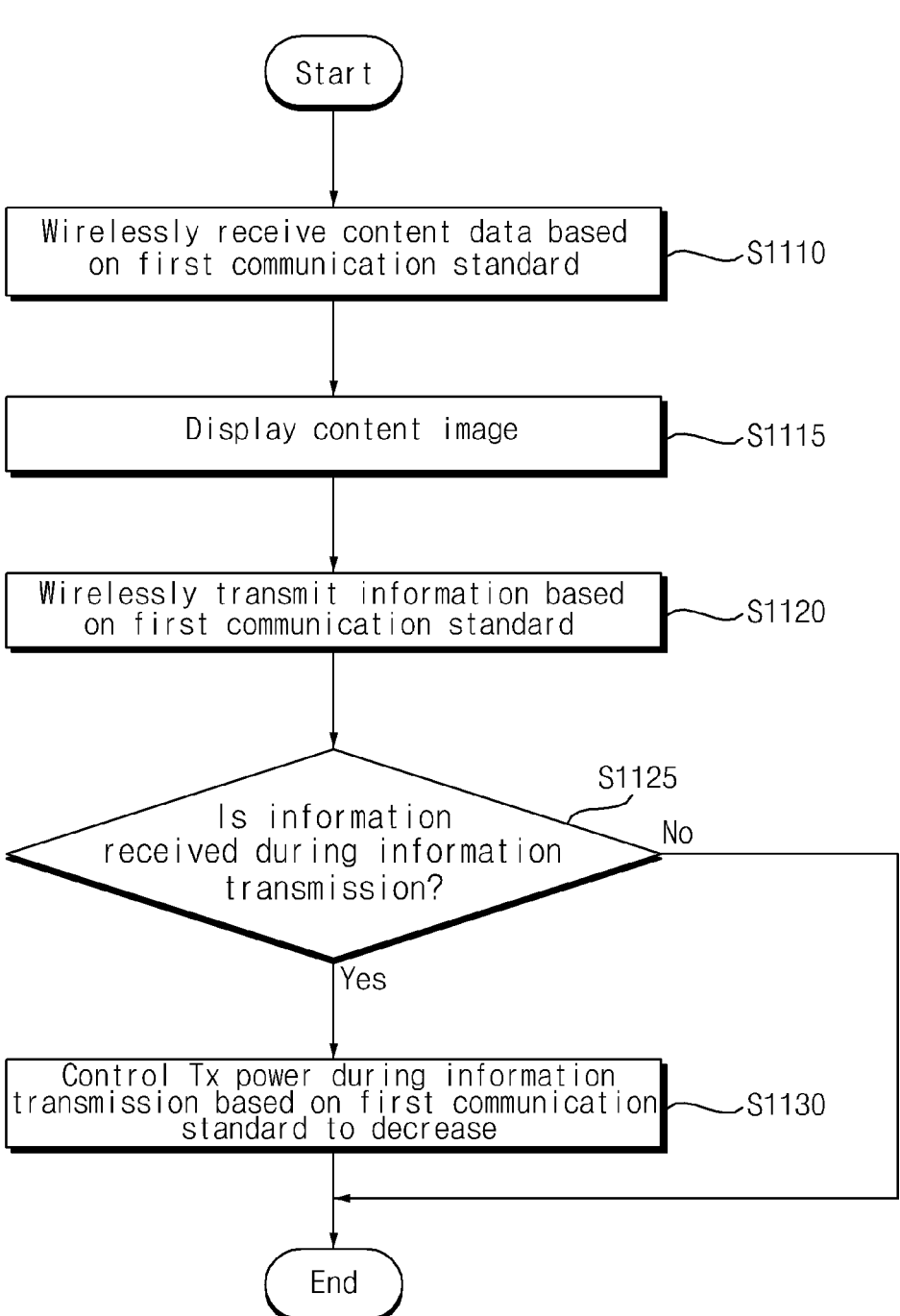
FIG. 11 is a flowchart illustrating a method of operating an image display apparatus according to an embodiment of the present disclosure.

FIG. 11 is a flowchart illustrating a method of operating an image display apparatus according to an embodiment of the present disclosure, and FIGS. 12A to 12D are views referred to in description of FIG. 11.

Referring to the figures, the signal processing device 170 in the image display apparatus 100 may access the server 500 or a content providing server (not shown) based on input of a remote control signal and receive content data, which is first data, from the server 500 of the content providing server (not shown).

Figure 12A:
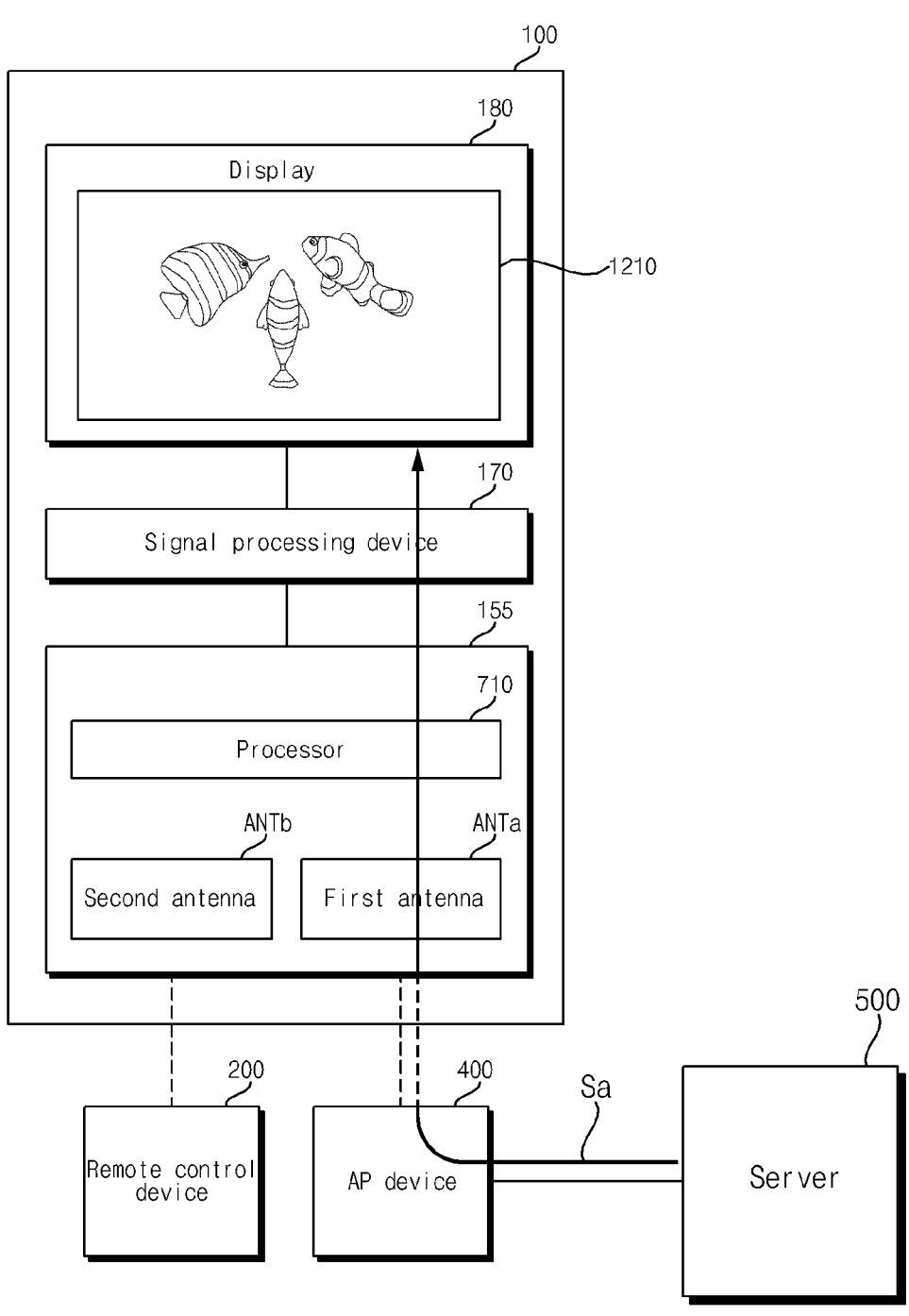
FIGS. 12A to 12D are views referred to in description of FIG. 11.

Specifically, the communication device 155 in the image display apparatus 100 accesses the server 500 or the content providing server (not shown) via the access point device 400, and the first antenna ANTa in the communication device 155 may wirelessly receive content data Sa, which is first data provided by the server 500 or the content providing server (not shown), from the access point device 400 based on the first communication standard, as shown in FIG. 12A (S1110).

The signal processing device 170 in the image display apparatus 100 may be configured to display a content image 1210 on the display 180 based on the content data Sa received by the communication device 155, as shown in FIG. 12A (S1115).

Figure 12B:
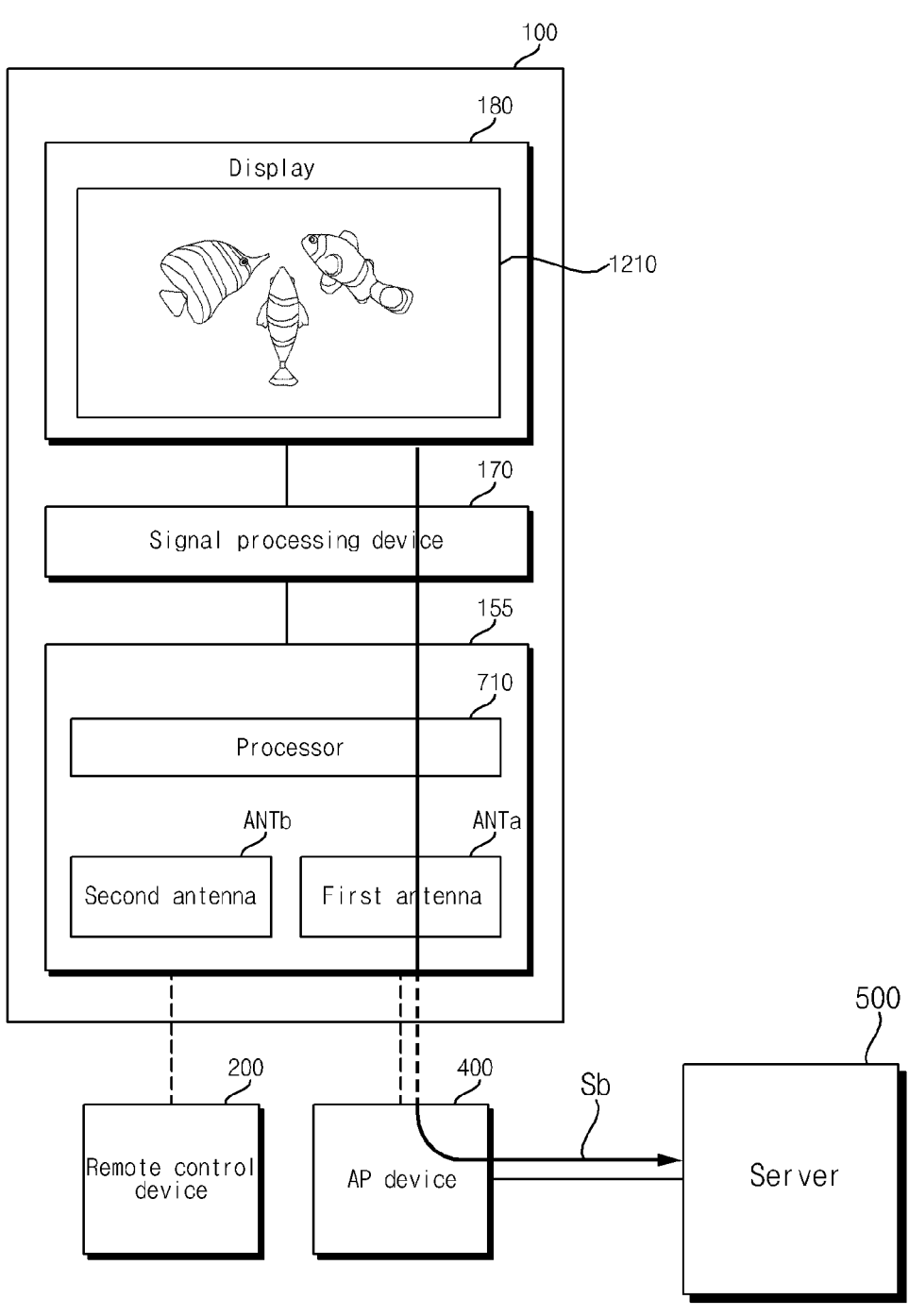

Further, the signal processing device 170 in the image display apparatus 100 may perform control such that information Sb related to the content image or the content data is transmitted to the server 500 or the content providing server (not shown) through the communication device 155, as shown in FIG. 12B.

Here, the information related to the content image or the content data may include viewing information including a viewing time, preference, and the like.

To this end, the communication device 155 may wirelessly transmit the information Sb related to the content data based on the first communication standard (S1120).

Specifically, the first antenna ANTa in the communication device 155 may wirelessly transmit the information Sb related to the content data to the access point device 400.

Figure 12C:
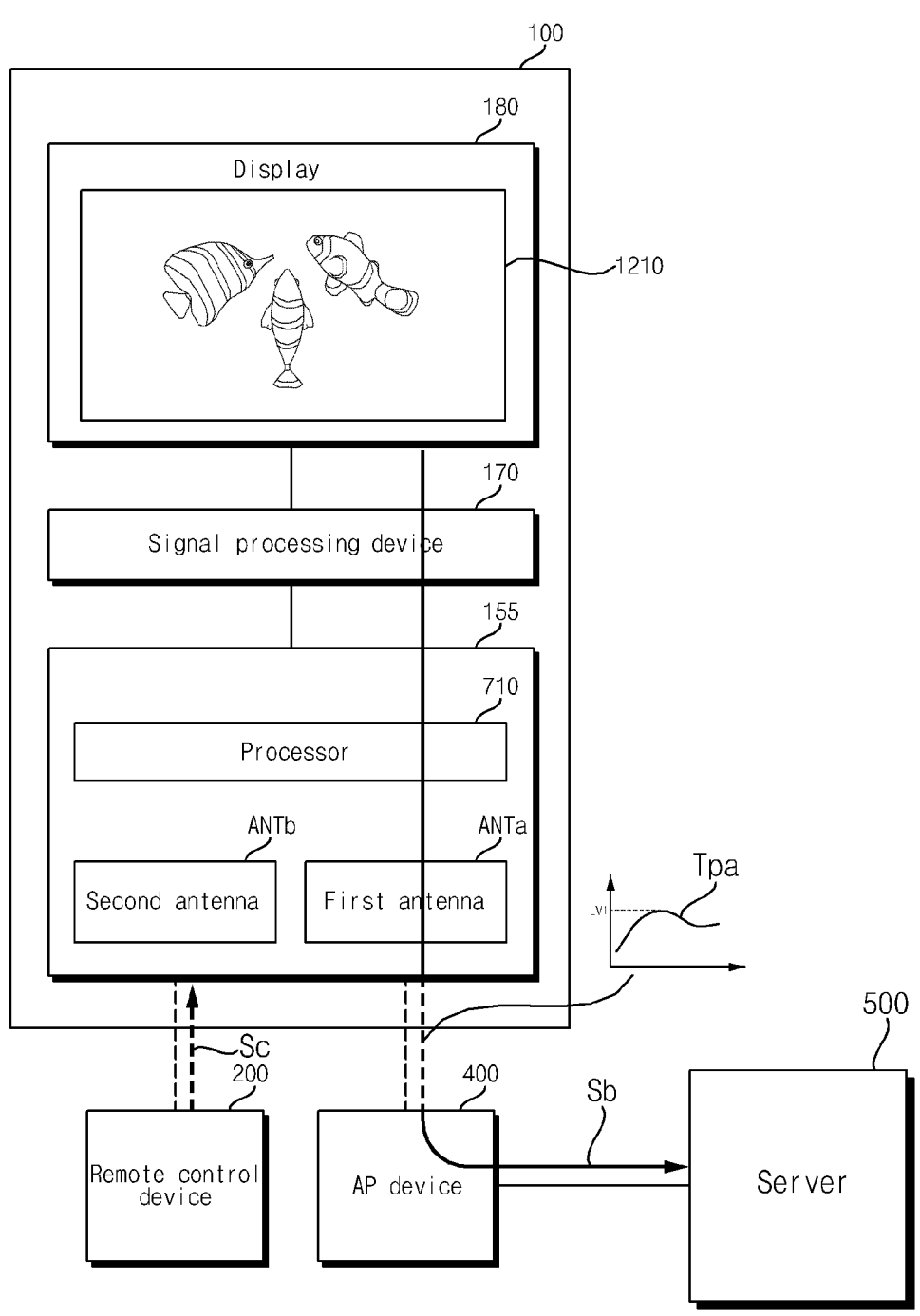

FIG. 12C illustrates a case in which a remote control signal or information Sc is received from the remote control device 200 or the mobile terminal 600 based on the second communication standard during wireless transmission of the information Sb related to the content data based on the first communication standard.

In particular, FIG. 12C illustrates that the wireless power of the information Sb related to the content data based on the first communication standard is the first power TPa, which is the set power. In particular, the figure shows that a high level of the first power Tpa is Lv1.

Figure 12D:
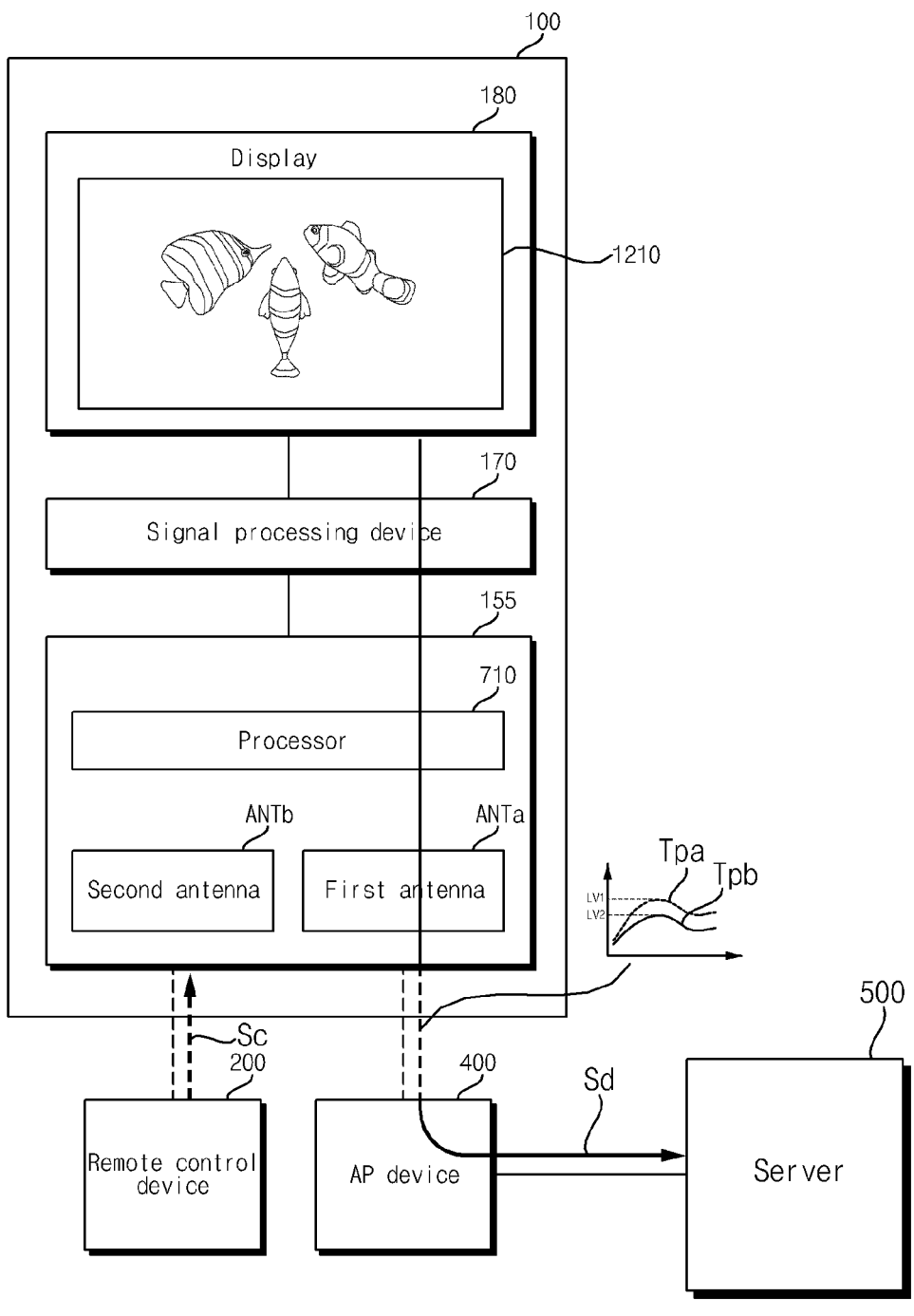

Meanwhile, in case in which the remote control signal or the information Sc is received from the remote control device 200 or the mobile terminal 600 based on the second communication standard during wireless transmission of information related to content data based on the first communication standard (S1125), the communication device 155 is configured to decrease the wireless power at the time of transmission of information Sd related to content data based on the first communication standard, as shown in FIG. 12D (S1130).

FIG. 12D shows that the wireless power of the information Sd related to the content data based on the first communication standard is the second power Tpb lower than the first power Tpa since the remote control signal or the information Sc is received from the remote control device 200 or the mobile terminal 600. In particular, the figure shows that a high level Lv2 of the second power Tpb is lower than the high level Lv1 of the first power Tpa.

Accordingly, the remote control signal or the information Sc from the remote control device 200 or the mobile terminal 600 based on the second communication standard is stably received.

Further, in case in which the second antenna ANTb receives a wireless signal while the first antenna ANTa wirelessly receives content data, which is first data, and wirelessly transmits information related to the content data with the first power, the processor 710 in the communication device 155 may be configured to wirelessly transmit the information related to the content data with the second power lower than the first power. Accordingly, it is possible to stably receive a wireless signal based on the second communication standard.

Further, in case in which the second antenna ANTb does not receive wireless signals for a predetermined period of time or longer while the first antenna ANTa wirelessly transmits the information related to the content data with the second power lower than the first power, the processor 710 in the communication device 155 may be configured to wirelessly transmit the information related to the content data with a power higher than the second power. Accordingly, it is possible to stably receive a wireless signal based on the second communication standard.

Further, the processor 710 in the communication device 155 may be configured to decrease the second power as the amount of information related to content data increases or a transmission period of the information related to the content data increases. Accordingly, it is possible to stably receive a wireless signal based on the second communication standard.

Further, the processor 710 in the communication device 155 may perform control such that information related to content data is wirelessly transmitted with the second power and a transmission interval of the information related to the content data increases as the amount of information related to the content data increases or the transmission period of the information related to the content data increases. Accordingly, it is possible to stably receive a wireless signal based on the second communication standard.

Meanwhile, a period in which the first antenna ANTa wirelessly transmits information related to content data may be shorter than a period in which the second antenna ANTb receives a wireless signal. Accordingly, it is possible to stably receive a wireless signal based on the second communication standard.

Further, the power of a wireless signal Sc received through the second antenna ANTb may be lower than the first power, which is wireless power for transmission through the first antenna ANTa. Accordingly, it is possible to stably receive a wireless signal based on the second communication standard.

Further, the power of the wireless signal Sc received through the second antenna ANTb may be lower than the second power, which is lower than the first power. Accordingly, it is possible to stably receive a wireless signal based on the second communication standard.

Meanwhile, frequency channel hopping may occur while the second antenna ANTb receives a wireless signal. Even if frequency channel hopping occurs in the wireless signal of the second antenna ANTb while the first antenna ANTa wirelessly transmits information related to content data with the second power lower than the first power, a channel margin is generated over the frequency channels and thus it is possible to stably receive a wireless signal based on the second communication standard.

Meanwhile, the communication device 155 in the image display apparatus 100 according to the embodiment of the present disclosure may wirelessly receive content data, which is first data, from the access point device 400 through the first antenna ANTa, transmit information related to the content data to the access point device 400, and receive a remote control signal from the remote control device 200 through the second antenna ANTb. Accordingly, it is possible to stably receive the remote control signal.

Further, the communication device 155 in the image display apparatus 100 according to the embodiment of the present disclosure may wirelessly receive the content data, which is the first data, from the access point device 400 through the first antenna ANTa, transmits information related to the content data to the access point device 400, and receives wireless data from the mobile terminal 600 through the second antenna ANTb. Accordingly, it is possible to stably receive wireless data from the mobile terminal 600.

A communication device according to an embodiment of the present disclosure includes: a first antenna configured to receive or transmit a wireless signal of a first communication standard; a second antenna configured to receive or transmit a wireless signal of a second communication standard; and a processor configured to receive and process a signal from the first antenna or the second antenna or to transmit a processed signal to the first antenna or the second antenna, wherein, in case in which the second antenna receives a wireless signal while the first antenna wirelessly receives first data and wirelessly transmits information related to the first data with a first power, the processor controls the first antenna to wirelessly transmit the information related to the first data with a second power lower than the first power.

Accordingly, it is possible to stably secure wireless reception performance during wireless communication based on a plurality of communication standards. In particular, it is possible to stably receive a wireless signal based on the second communication standard during data transmission based on the first communication standard and wireless signal reception based on the second communication standard.

In case in which the second antenna receives a wireless signal while the first antenna wirelessly receives content data which is the first data and wirelessly transmits information related to the content data with the first power, the processor may control the first antenna to wirelessly transmit the information related to the content data with the second power lower than the first power. Accordingly, it is possible to stably receive a wireless signal based on the second communication standard.

The processor may control the first antenna to wirelessly transmit the information related to the content data with a power higher than the second power in case in which the second antenna does not receive wireless signals for a predetermined time or longer while the first antenna wirelessly transmits the information related to the content data with the second power lower than the first power. Accordingly, it is possible to stably receive a wireless signal based on the second communication standard.

The processor may control the second power to decrease as an amount of information related to the content data increases or a transmission period of the information related to the content data increases. Accordingly, it is possible to stably receive a wireless signal based on the second communication standard.

The processor may be configured to wirelessly transmit the information related to the content data with the second power and increase a transmission interval of the information related to the content data as the amount of information related to the content data increases or the transmission period of the information related to the content data increases. Accordingly, it is possible to stably receive a wireless signal based on the second communication standard.

A period in which the first antenna wirelessly transmits the information related to the content data may be shorter than a period in which the second antenna receives a wireless signal. Accordingly, it is possible to stably receive a wireless signal based on the second communication standard.

Power of a wireless signal received by the second antenna may be lower than the first power. Accordingly, it is possible to stably receive a wireless signal based on the second communication standard.

The power of the wireless signal received by the second antenna may be lower than the second power. Accordingly, it is possible to stably receive a wireless signal based on the second communication standard.

Frequency channel hopping may occur during wireless signal reception through the second antenna. Accordingly, it is possible to stably receive a wireless signal based on the second communication standard.

The processor may control a wireless transmission power of the first antenna to be lower than a set power in case in which the second antenna performs wireless reception in a state in which the first antenna performs wirelessly transmission, and wireless transmission communication traffic of the first antenna is equal to or greater than a set level. Accordingly, it is possible to stably receive a wireless signal based on the second communication standard.

The processor may control the wireless transmission power of the first antenna to become the set power in case in which the second antenna performs wireless reception in a state in which the first antenna performs wirelessly transmission, and the wireless transmission communication traffic of the first antenna is less than the set level. Accordingly, it is possible to stably receive a wireless signal based on the second communication standard while stably performing data transmission based on the first communication standard.

An image display apparatus according to an embodiment of the present disclosure includes: a display; a signal processing device configured to control the display; a communication device configured to perform wireless communication based on a first communication standard or to perform wireless communication based on a second communication standard, wherein the communication device includes: a first antenna configured to receive or transmit a wireless signal of the first communication standard; a second antenna configured to receive or transmit a wireless signal of the second communication standard; and a processor configured to receive and process a signal from the first antenna or the second antenna or to transmit a processed signal to the first antenna or the second antenna, wherein, in case in which the second antenna receives a wireless signal while the first antenna wirelessly receives first data and wirelessly transmits information related to the first data with a first power, the processor controls the first antenna to wirelessly transmit the information related to the first data with a second power lower than the first power. Accordingly, it is possible to stably secure wireless reception performance during wireless communication based on a plurality of communication standards. In particular, it is possible to stably receive a wireless signal based on the second communication standard during data transmission based on the first communication standard and wireless signal reception based on the second communication standard.

The communication device may wirelessly receive content data which is first data from an access point device through the first antenna, transmit information related to the content data to the access point device, and receive a remote control signal from a remote control device through the second antenna. Accordingly, it is possible to stably receive the remote control signal.

The communication device may wirelessly receive content data which is first data from an access point device through the first antenna, transmit information related to the content data to the access point device, and receive wireless data from a mobile terminal through the second antenna. Accordingly, it is possible to stably receive wireless data from the mobile terminal.

The signal processing device may be configured to display a content image corresponding to content data received through the communication device on the display, and information related to the content image is transmitted to a server through the communication device. Accordingly, it is possible to stably transmit the information related to the content image.

The communication device may wirelessly transmit the information related to the content image with the second power lower than the first power in case in which a wireless signal is received from a remote control device or a mobile terminal while the information related to the content image is wirelessly transmitted through the first antenna.

The signal processing device may control a notification message indicating wireless signal instability to be output in case in which a wireless signal is wirelessly transmitted with the first power in a state in which a wireless signal is received through the second antenna during wireless transmission of the information related to the content image through the first antenna, and may control the notification message to disappear in case in which a wireless signal is wirelessly transmitted with the second power lower than the first power in a state in which a wireless signal is received through the second antenna during wireless transmission of the information related to the content image through the first antenna. Accordingly, it is possible to immediately notify a wireless communication state.

While the present disclosure has been particularly shown and described with reference to exemplary embodiments thereof, it will be understood by those of ordinary skill in the art that various changes in form and detail may be made herein without departing from the spirit and scope of the present disclosure as defined by the following claims and such modifications and variations should not be understood individually from the technical idea or aspect of the present disclosure.

What is claimed is:

1. A communication device comprising:
a first antenna configured to receive or transmit a wireless signal of a first communication format;
a second antenna configured to receive or transmit a wireless signal of a second communication format different from the first communication format; and
a processor configured to receive and process a signal from the first antenna or the second antenna or to transmit a processed signal to the first antenna or the second antenna,
wherein, in case in which the second antenna receives a wireless signal while the first antenna wirelessly receives first data and
wirelessly transmits information related to the first data with a first power, the processor controls the first antenna to wirelessly transmit the information related to the first data with a second power lower than the first power,
wherein the first data includes content data, and
wherein the processor is configured to wirelessly transmit the information related to the content data with the second power, and
increase a transmission interval of the information related to the content data as an amount of information related to the content data increases or a transmission period of the information related to the content data increases.

2. The communication device according to claim 1, wherein, in case in which the second antenna receives a wireless signal while the first antenna wirelessly receives the content data and wirelessly transmits information related to the content data with the first power, the processor controls the first antenna to wirelessly transmit the information related to the content data with the second power lower than the first power.

3. The communication device according to claim 2, wherein the processor controls the first antenna to wirelessly transmit the information related to the content data with a power higher than the second power in case in which the second antenna does not receive wireless signals for a predetermined time or longer while the first antenna wirelessly transmits the information related to the content data with the second power lower than the first power.

4. The communication device according to claim 2, wherein a period in which the first antenna wirelessly transmits the information related to the content data is shorter than a period in which the second antenna receives a wireless signal.

5. The communication device according to claim 1, wherein a power of a wireless signal received by the second antenna is lower than the first power.

6. The communication device according to claim 1, wherein a power of the wireless signal received by the second antenna is lower than the second power.

7. The communication device according to claim 1, wherein frequency channel hopping occurs during wireless signal reception through the second antenna.

8. The communication device according to claim 1, wherein the processor controls a wireless transmission power of the first antenna to be lower than a set power in case in which the second antenna performs wireless reception in a state in which the first antenna performs wirelessly transmission, and wireless transmission communication traffic of the first antenna is equal to or greater than a set level.

9. The communication device according to claim 8, wherein the processor controls the wireless transmission power of the first antenna to become the set power in case in which the second antenna performs wireless reception in a state in which the first antenna performs wirelessly transmission, and the wireless transmission communication traffic of the first antenna is less than the set level.

10. An image display apparatus comprising:

a display;

a signal processing device configured to control the display;

a communication device configured to perform wireless communication based on a first communication format or to perform wireless communication based on a second communication format different from the first communication format, wherein the communication device comprises:

a first antenna configured to receive or transmit a wireless signal of the first communication format;

a second antenna configured to receive or transmit a wireless signal of the second communication format; and a processor configured to receive and process a signal from the first antenna or the second antenna or to transmit a processed signal to the first antenna or the second antenna, wherein, in case in which the second antenna receives a wireless signal while the first antenna wirelessly receives first data and wirelessly transmits information related to the first data with a first power, the processor controls the first antenna to wirelessly transmit the information related to the first data with a second power lower than the first power, wherein the first data includes content data, and wherein the processor is configured to wirelessly transmit the information related to the content data with the second power, and increase a transmission interval of the information related to the content data as an amount of information related to the content data increases or a transmission period of the information related to the content data increases.

11. The image display apparatus according to claim 10, wherein the communication device wirelessly receives the content data from an access point device through the first antenna, transmits information related to the content data to the access point device, and receives a remote-control signal from a remote-control device through the second antenna.

12. The image display apparatus according to claim 10, wherein the communication device wirelessly receives the content data from an access point device through the first antenna, transmits information related to the content data to the access point device, and receives wireless data from a mobile terminal through the second antenna.

13. The image display apparatus according to claim 10, wherein the signal processing device is configured to display a content image corresponding to the content data received through the communication device on the display, and transmit information related to the content image to a server through the communication device.

14. The image display apparatus according to claim 13, wherein the communication device wirelessly transmits the information related to the content image with the second power lower than the first power in case in which a wireless signal is received from a remote control device or a mobile terminal while the information related to the content image is wirelessly transmitted through the first antenna.

15. The image display apparatus according to claim 10, wherein the signal processing device controls a notification message indicating wireless signal instability to be output in case in which a wireless signal is wirelessly transmitted with the first power in a state in which a wireless signal is received through the second antenna during wireless transmission of the information related to a content image through the first antenna, and controls the notification message to disappear in case in which a wireless signal is wirelessly transmitted with the second power lower than the first power in a state in which a wireless signal is received through the second antenna during wireless transmission of the information related to the content image through the first antenna.

16. The image display apparatus according to claim 12, wherein, in case in which the second antenna does not receive wireless signals for a predetermined time or longer while the first antenna wirelessly transmits the information related to the content data with the second power lower than the first power, the processor controls the first antenna to wirelessly transmit the information related to the content data with a power higher than the second power.

\* \* \* \* \*